United States Patent [19]
Chen et al.

[11] Patent Number: 6,091,401
[45] Date of Patent: Jul. 18, 2000

[54] DEVICE FOR CONTROLLING A CURSOR TO ROTATE RIGHTWARDS AND LEFTWARDS AND THE METHOD OF THE SAME

[76] Inventors: Mei Yun Chen; Fu Kuo Yeh, both of Fl., 3, No. 2, Lane 42, Hou Kang St., Shih Lin District, Taipei, Taiwan

[21] Appl. No.: 08/867,519

[22] Filed: Jun. 2, 1997

[51] Int. Cl.[7] .................................................. G09G 5/08
[52] U.S. Cl. ........................ 345/156; 345/163; 345/166
[58] Field of Search .................................. 345/157, 158, 345/159, 161, 163, 169, 160, 166; 74/471 XY

[56] References Cited

U.S. PATENT DOCUMENTS

| | | | |
|---|---|---|---|
| 4,670,743 | 6/1987 | Zemke | 345/157 |
| 4,887,230 | 12/1989 | Noguchi et al. | 364/560 |
| 5,086,296 | 2/1992 | Clark | 345/157 |
| 5,563,630 | 10/1996 | Tsakiris et al. | 345/169 |
| 5,598,187 | 1/1997 | Ide et al. | 345/158 |
| 5,808,603 | 9/1998 | Chen | 345/157 |

*Primary Examiner*—Chanh Nguyen
*Assistant Examiner*—John Suraci
*Attorney, Agent, or Firm*—Smith, Gambrell & Russell, LLP; Beveridge, DeGrandi, Weilacher & Young Intellectual Property Group

[57] ABSTRACT

The present invention is related to a device for controlling a cursor to rotate rightwards and leftwards and the method thereof, wherein a X axis sliding bar and a Y axis sliding bar are installed between the cover and base of said mouse, and said X axis sliding bar and said Y axis sliding bar are used as the X axis movable optic grid and the Y axis movable optic grid, respectively, said X axis movable optic grid and said Y axis movable optic grid will rotate with said base within a proper angle. When said cover of said mouse is moved or rotated, said X axis movable optic grid and said Y axis movable optic grid will move or rotate synchronously and match the installation of a light emitted diode, a photo transistor, fixing optic grids and a controlling circuit so that the cursor on the computer display may be controlled with a small active range.

13 Claims, 28 Drawing Sheets

FIG.12E
```
XA ⎍⎍⎍⎍⎍  ⎍⎍⎍⎍⎍
XB ⎍⎍⎍⎍⎍  ⎍⎍⎍⎍⎍
XA 0010011    01100111
XB 0011001    00110111
   ←          →
   Xmin       Xmax
```

DEVICE FOR CONTROLLING A CURSOR TO ROTATE RIGHTWARDS AND LEFTWARDS AND THE METHOD OF THE SAME

BACKGROUND OF THE INVENTION

1. Field of the Invention

The present invention is related to a device for controlling a cursor to rotate rightwards and leftwards and the method thereof, especially to a cursor controlling device for rotating a X axis movable optic grid and a Y axis movable optic grid to a proper angle, further, said cursor may be moved intendedly.

2. Description of the Prior Art

The cursor controlling technique in the conventional computer display comprises a keyboard, a mouse, a trace ball, a touch controlling display, a optical pen, etc. However, it is generally inconvenient to control the movement and positioning of a cursor by using the conventional cursor controlling devices. For example, it is ineffective to use a conventional keyboard to drive a cursor. While if a conventional mouse is used to control the movement of the cursor, the mouse must be moved on the table, and accordingly the arm is also moved, wherein the movement of twist will drive the moving of the front arm, subsequently, the rear arm is also moved, in consequently, the frequent movement of arm is not met the requirement of Ergonomics, therefore, for a long period of usage, the arm will has an ache easily.

U.S. Pat. No. 4,935,728 disclosed a square opening 136a formed on a top plate 134a of the outer case 132a as shown in FIG. 1. The square opening 136a servers as margin for the finger-grippable element. The photo encoder includes a series of mask sections and transparent sections interleavely. In case the photo encoder with phase A and phase B is required to generate 320 phase signals per inch (not includes the central portion), the minimum distance with a mask section and a transparent section on the photo encoder will be 0.16 mm(25.4 mm/160=0.16 mm). In consideration of the 90 degrees phase difference between the phases A and B, the distance will be equal to 0.08 mm. The narrow displacement nears a maximum tolerant range during operation. Further, when the hardware sends out a pulse signal, it must displace a travel length of 0.08 mm. It will a require rather precise movement to generate 320 pixels signal within a distance ranges of 25.4 mm. It is therefore noted that the prior art patent requires precise parallel structure for configuring the square opening and photo encoder in manufacture and assembly. Otherwise, each dot on the square opening in Y-axis direction will have an incorrect X-axis margin value; similarly, each dot on the square opening in X-axis direction will have an incorrect Y-axis margin value.

To match the different resolution of the various display, for example 800*600 or 1280*1204, the following various methods are possible:

1. increasing the size of the finger controllable member; or
2. decreasing the distance between each mask section and transparent section on the photo encoder.

The former method will tire the user due to the length of the finger controllable member is increased, especially the operating range is limited in left and right direction in movement. The second method above will has problem that it can not correctly generate a signal at each moving time because that the distance is decreased causing a small effective displacement. Moreover, it is possible to cause a problem that the pointing device generates two or three pulse signals at each moving time. The design of shorten the distance of photo encoder can reduce the operating ranges of user hand during moving the finger controllable member, and it is especially applicable in use of remote controller for a multi-media system with more convenience and comfort, if the moving range of the finger controllable member is smaller then 16 mm, then the moving of the fingers will be confined dramatically.

SUMMARY OF THE INVENTION

In order to overcome said defect in the conventional device, a absolute coordinate positioning device is disclosed. The inventor of the present invention has disclosed some inventions, for example, Taiwam Patent Application Nos. 84205828 and 84295829, title: "Mechanical optic absolute coordinate cursor controlling device (1), (2)," and the PCT International Patent Nos. PCTCN950042, and PCTCN950043, and afterward another inventions are disclosed, Taiwan Patent Application Nos. 84217771, title: "Cursor Positioning Device," and Taiwan Patent Application Nos. 85208588, title: "An Improvement Structure of a Cursor Positioning Device". The present invention is a further improvement about said inventions "Cursor Positioning Device," and "An Improvement Structure of a Cursor Positioning Device".

The present invention is related to a device for controlling a cursor to rotate rightwards and leftwards and the method thereof, wherein a X axis sliding bar and a Y axis sliding bar are installed between the cover and base of said mouse, and said X axis sliding bar and said Y axis sliding bar are used as the X axis movable optic grid and the Y axis movable optic grid, respectively, said X axis movable optic grid and said Y axis movable optic grid will rotate with said base within a proper angle. When said cover of said mouse is moved or rotated, said X axis movable optic grid and said Y axis movable optic grid will move or rotate synchronously and match the installation of a light emitted diode, a photo transistor, fixing optic grids and a controlling circuit so that the cursor on the computer display may be controlled with a small active range.

BRIEF DESCRIPTION OF THE DRAWINGS

The invention, as well as its many advantages, may be further understood by the following description and drawings in which:

FIGS. 12A–F shows the photo structure and waveform for the two sets of photo transistor detection used in the positioning device of the present invention;

DETAILED DESCRIPTION OF THE PREFERRED EMBODIMENT

Figure 12A:
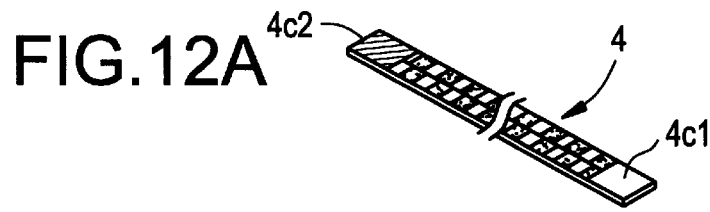
Figure 12B:
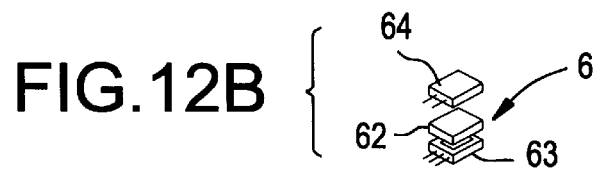
Figure 12C:
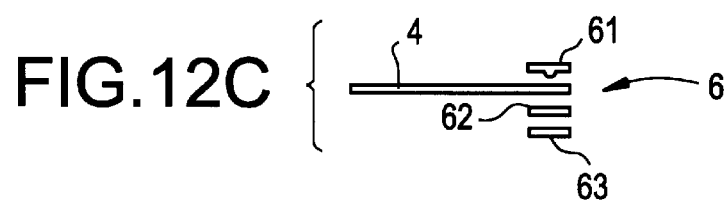
Figure 14:
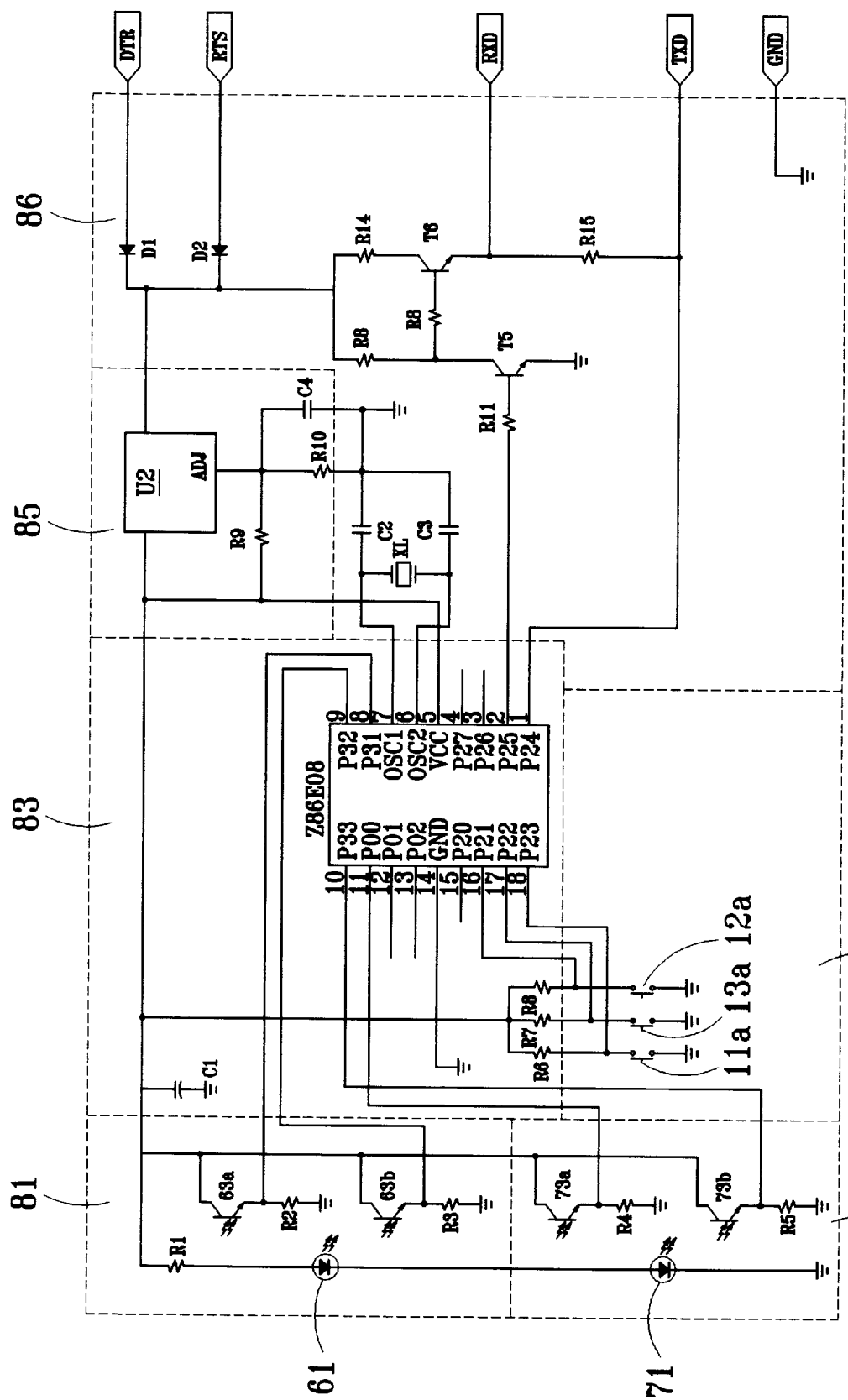
FIG. 14 shows the application circuit of the photo transistor for detecting the two sets of photoelectric structure in FIG. 12.
Figure 15A:
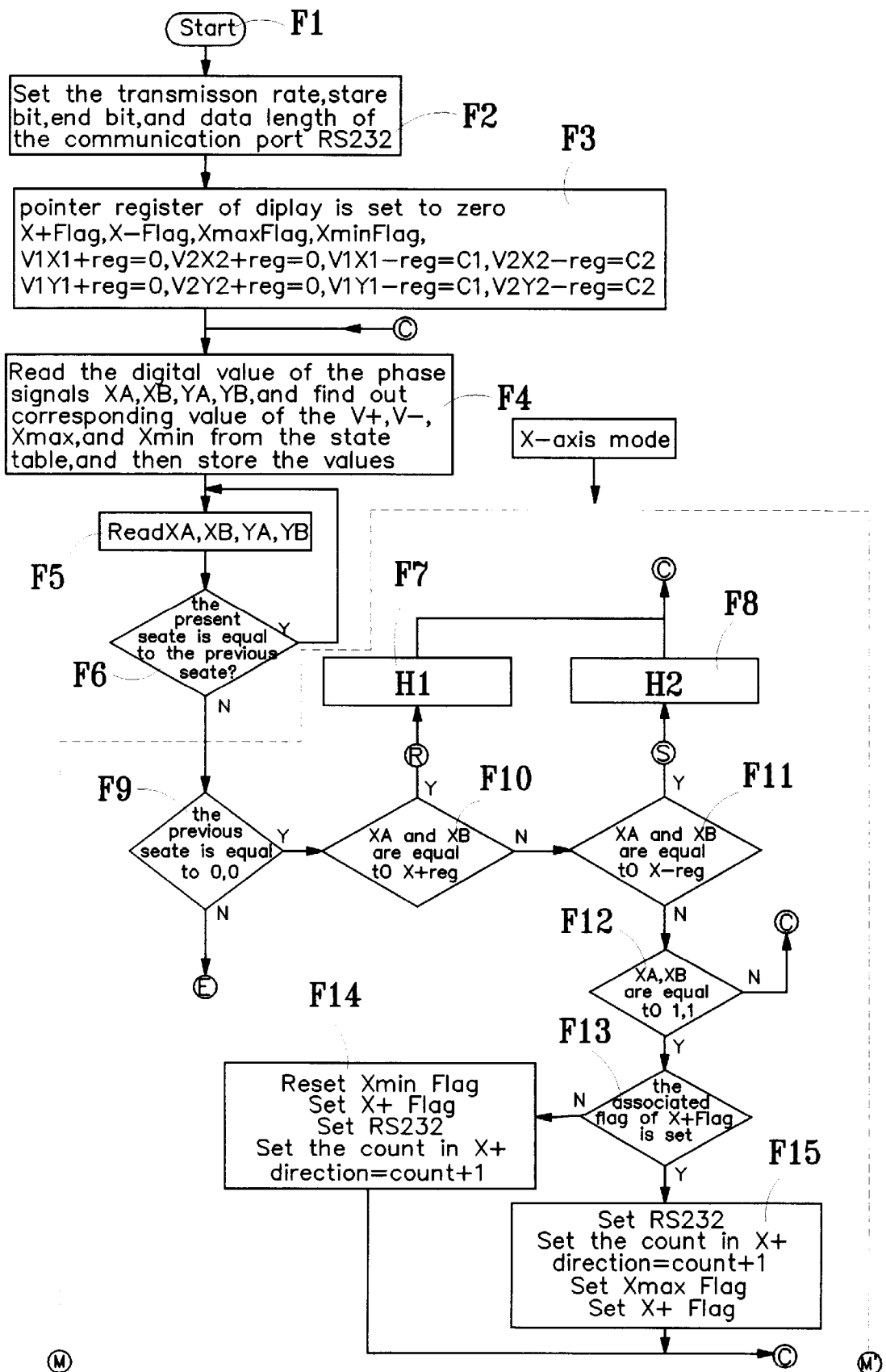
FIGS. 15A–E is the flow diagram for detecting the two sets of photo transistors.
Figure 15B:
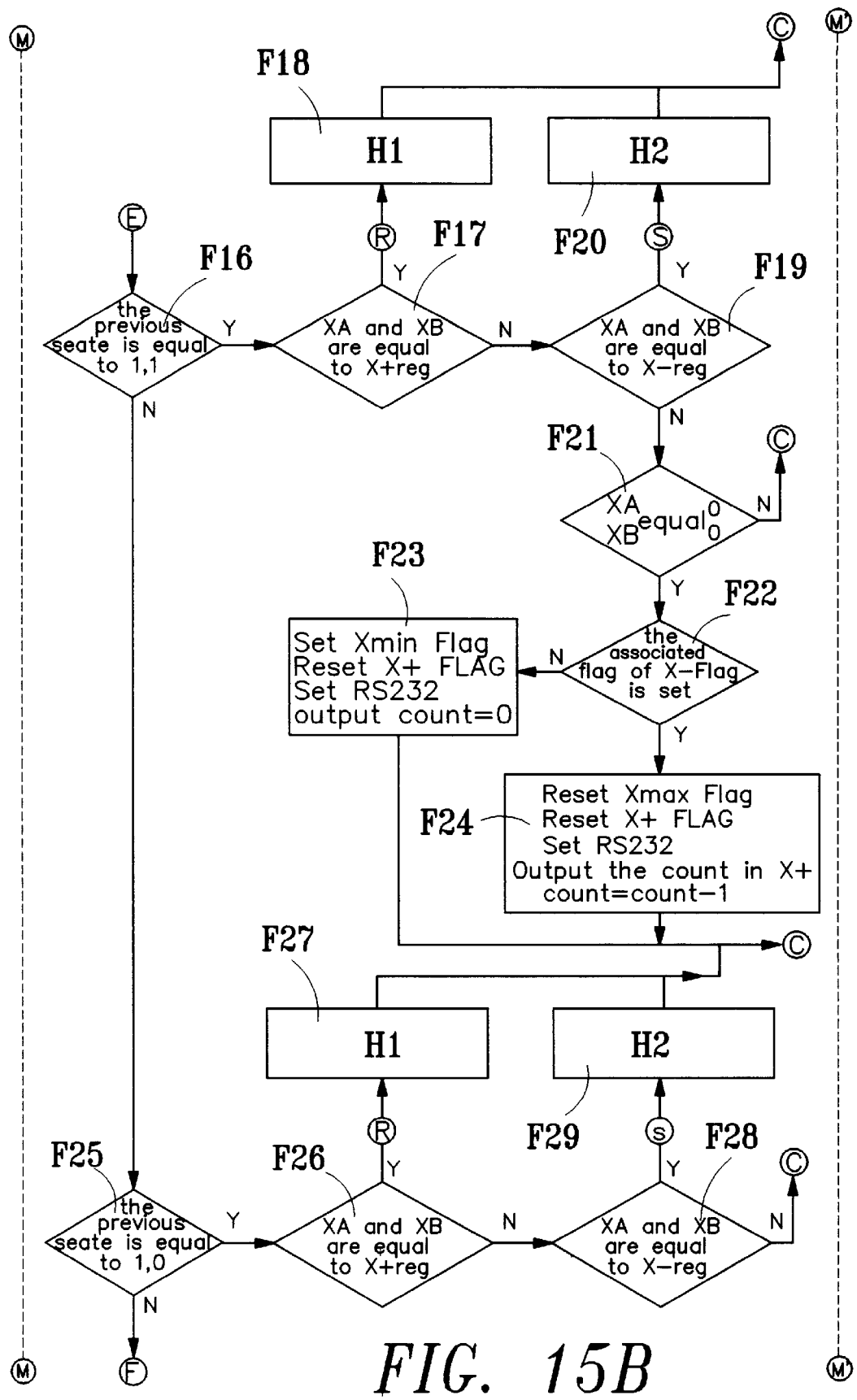
Figure 15C:
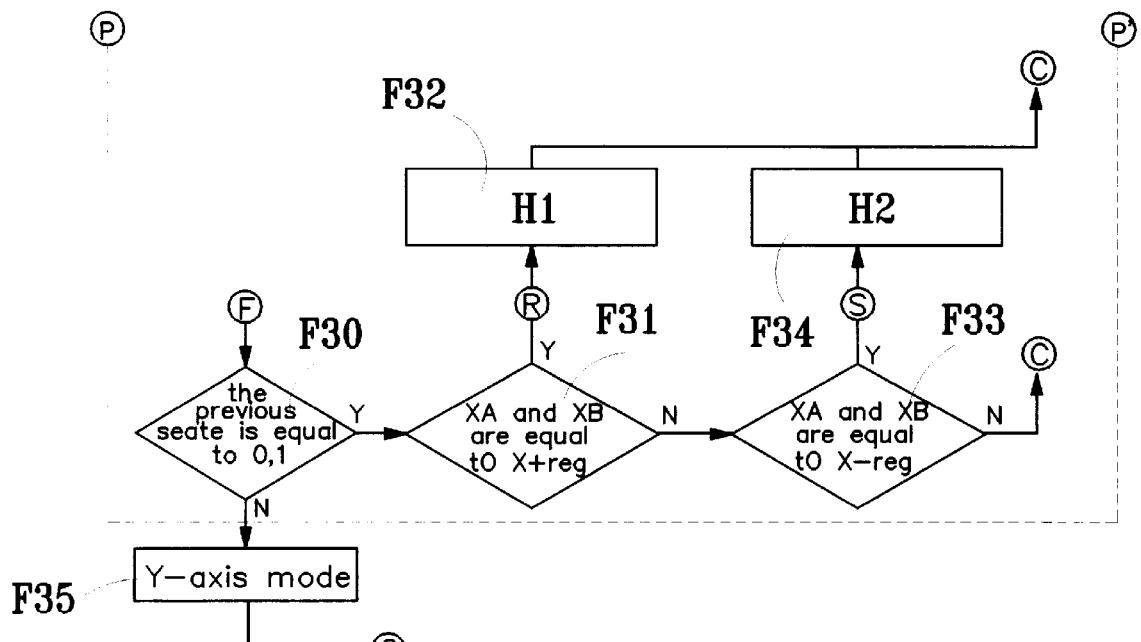

FIGS. 12A to 12F show the structure and signal waveform of the photo encoder and the photo detector in accordance with the pointing device of the present invention. This embodiment uses two photo transistors to detect the light beam of a LED. The photo encoder 4 has two printed pattern lines as shown in FIG. 12A. Both the printed attern line has a series of mask sections and transparent sections interleavely with uniform width, but with 90 degrees phase difference therebetween. When the photo encoder 4 is moved relative to the photo detector 6 as shown in FIG. 12C, the light generated by the LED 61 will be detected by the photo detector 63 via the photo encoder 4 and the calibrating photo encoder 62. Therefore, the photo detector 63 generates a series of binary pulse signals and transmits the signals to the control circuit board 18. Under performance of the control circuit as shown in FIG. 14 and the control flows as shown in FIGS. 15A to 15C, the moving direction of the photo encoder may be detected according to the binary pulse signals.

Another, it shows that one end of the X-axis photo encoder 4 has a transparent end section 4C1, and the other end thereof has a mask end section 4C2. The purpose of the transparent and mask end section is to serve as a left margin Xmin and a right margin Xmax of the X-axis photo encoder. Similarly, the Y-axis photo encoder has a left margin and a right margin. It is to be understood from this arrangement that the margin are obtained directly from the photo encoder capable of providing digital form signal. Obviously, the present invention is different from the prior art, and it is easier to design a control program for determination.

Figure 12D:
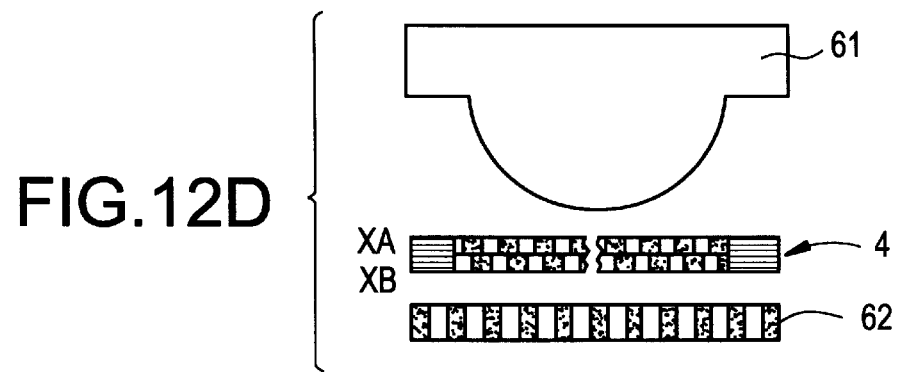
Figure 12F:
Figure 13A:
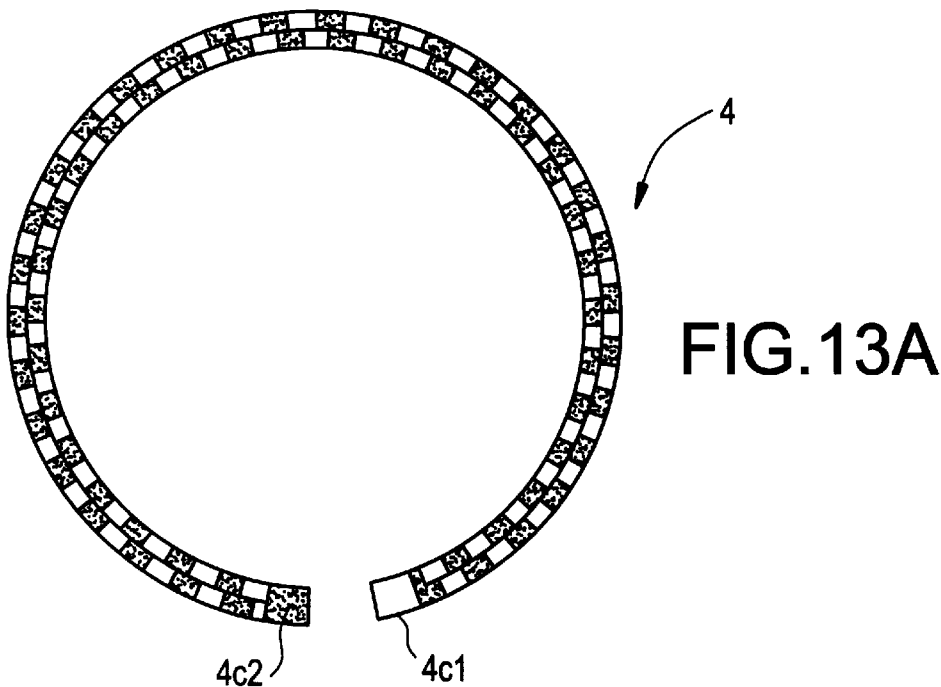
FIGS. 13A–D shows the photo structure for detection used in the positioning device of the present invention.
Figure 13B:
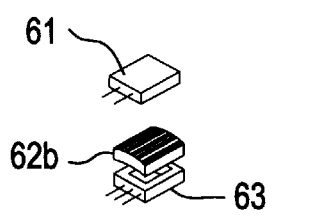
Figure 13C:
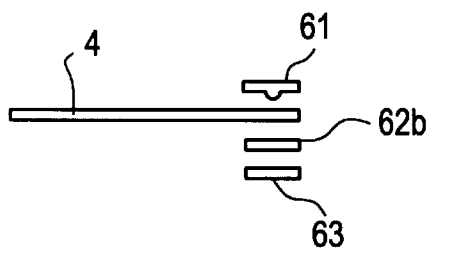
Figure 13D:
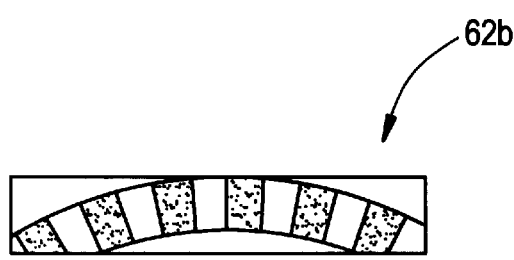

Alternately, the photo encoder 4 in said FIG. 12A may has an end section 4C3 combining a transparent line and a mask line as shown in FIG. 12F, instead of the end section 4C1 and 4C2 shown in FIG. 12A. In performance, both the signals XA and XB will be changed its phase at the same time after reaching the margin of the photo encoder 4 and exceeding a distance of ¼ period. On the contrary, the phase of signal XA or XB will be changed when it does not reach the margin of the photo encoder. So, the control circuit of the present invention may detect whether the phase of the signals XA and XB is changed at the same time to determine whether the photo encoder reaches its margin or not.

Table I is a state table which shows when a computer system connected with the cursor positioning device of the present invention receives the signals XA and XB, the computer can determine the moving direction X+ or X− of the positioning device according to the binary value of the signals XA and XB. The computer may get a flag Xmax and a flag Xmin according to the signal X+ and X− respectively, and then store the status of the flags into a register.

Referring to FIG. 12B again, it shows a perspective view of the X-axis photo detector 6 suitable to use the photo encoder as shown in FIG. 12A. The photo detector is composed of a LED 61, a fixed calibrating photo encoder 62, and a photo transistor 63. The arrangement of the components of the photo detector and the movable photo encoder 4 is illustrated in FIG. 12C. As shown in the drawing, the photo encoder 4 is arranged between the fixed calibrating photo encoder 62 and the LED 61. Therefore, the light beam transmitted by the LED 61 may either reach to the photo transistor 63 via the movable photo encoder 4 or be obstructed by the photo encoder. The fixed calibrating photo encoder 62 has a series of printed patterns including transparent sections and mask sections interleavely as shown in FIG. 12D, and the width of the printed pattern is designed to correspond to that of the movable photo encoder 4. In a preferred embodiment of the present invention, the movable photo encoder 4 is very closed to the fixed calibrating photo encoder 62, so that the light beam generated by the LED 61 reaches the photo transistor 63 through the movable photo encoder 4 without light diffusion. FIG. 12E shows a series of pulse signals XA and XB generated by the photo detector assembly.

It is noted that the movable photo encoder 4 of the present invention is equipped with interleaved printed patterns and the movable photo encoder 4 is designed to close to the fixed photo encoder 62 in space when moving, capable of generating a series of ON and OFF signals. Due to this special design, the pitch of the encoder is possible to reach 320 patterns per inch. The prior art requires laser beam LEDs to get the effect of high density pitch, otherwise the conventional photo detector will has series light diffusion problem. These prior art problems can be simply overcame by the present invention.

FIG. 14 is a detail control circuit diagram with four sets of photo detecting circuits, with reference to the photo detector shown in FIG. 12. In this embodiment, the X-axis phase signals are detected by two photo detecting circuit 81 and 81a. The first X-axis photo detecting circuit 81 includes a LED 61a for generating a light beam which will be detected by the photo transistors 63a and 63b. The second X-axis photo detecting circuit 81a includes a LED 61b for generating a light beam which will be detected by the photo transistors 63c and 63d. The Y-axis phase signals are detected by two photo detecting circuit 82 and 82a. The first Y-axis photo detecting circuit 82 includes a LED 71a for generating a light beam which will be detected by the photo transistors 73a and 73b. The second Y-axis photo detecting circuit 82a includes a LED 71b for generating a light beam which will be detected by the photo transistors 73c and 73d. The detected X-axis and Y-axis phase signals are supplied to a processing circuit 83 for further processes. A switch circuit 84 are electrically connected to the processing circuit 83, which includes a left switch 11a, a right switch 12b, and a middle switch 13c. The control circuit is provided with a voltage regulating circuit 85 for supplying a stable power source. An output circuit 86 is used to amplify the output signal supplied from the processing circuit 83 and then supply the amplified output signal to a host computer (not shown) via transmission lines.

Referring to FIG. 15A, the computer first set the transmission rate, start bit, end bit, and data length of the communication port RS232 in step F2, followed by performing system initialization step F1. In step F3, all flag status, registers, and associated value for determination of operating speed are cleared. Thereafter, the computer reads the digital value of the phase signals XA, XB, YA, and YB, and finds out corresponding value of the X+, X−, Xmax, and Xmin from the state table of TABLE I as listed previously (only show the state of X-axis), and then stores the values for further comparison. The computer will reads the values XA, XB, YA, and YB again in step F5, and then compares these values with the first read values, to determine whether the status is changed or not. If the status is not changed, it indicates the finger controllable member of the cursor positioning device has no movement, and the procedure will return to read the XA, XB, YA, and YB again. On the contrary, if the status is changed, a X-mode determination procedure outlined by dot line as shown in FIG. 15A, is performed. There are four possible status i.e. (0,0), (1,0), (1,1), and (0,1) to be compared with the previous status. The computer may get the information about the moving speed of the cursor positioning device by calculating the time of changing of the various status.Typically, the system clock of the computer is ranged from 4 to 8 MHz nowadays. In practice, it is found that the normal operating speed that the user moves the finger controllable member of the cursor positioning device is below 5 KHz. Therefore, the computer may easily detect the operating speed of the cursor positioning device.

The computer may determine the position of the cursor with reference to TABLE I above and the pulse signal listed in FIG. 12E. At first, the computer supposes the previous status is (0,0) in step F9. In case that XA=1 and XB=0, it indicates the finger controllable member is moved to direction X+, while in case that XA=0 and XB=1, it indicates the finger controllable member is moved to direction X−. In case that XA=1 and XB=1, it indicates the finger controllable member either reaches a minimum limit or maximum limit dependent on whether the flag X+flag is set or not. After these determinations, various flag status X+, Xmin, Xman, etc. are obtained, and then these flag status are accumulated in predetermined registers for further judgment for the control program. So, in practical operation, the user just simply moves the finger controllable member to the left upper corner of the device to perform zero position initialization, and then the device can generate correct X-axis and Y-axis absolute coordinate values.

Figure 15D:
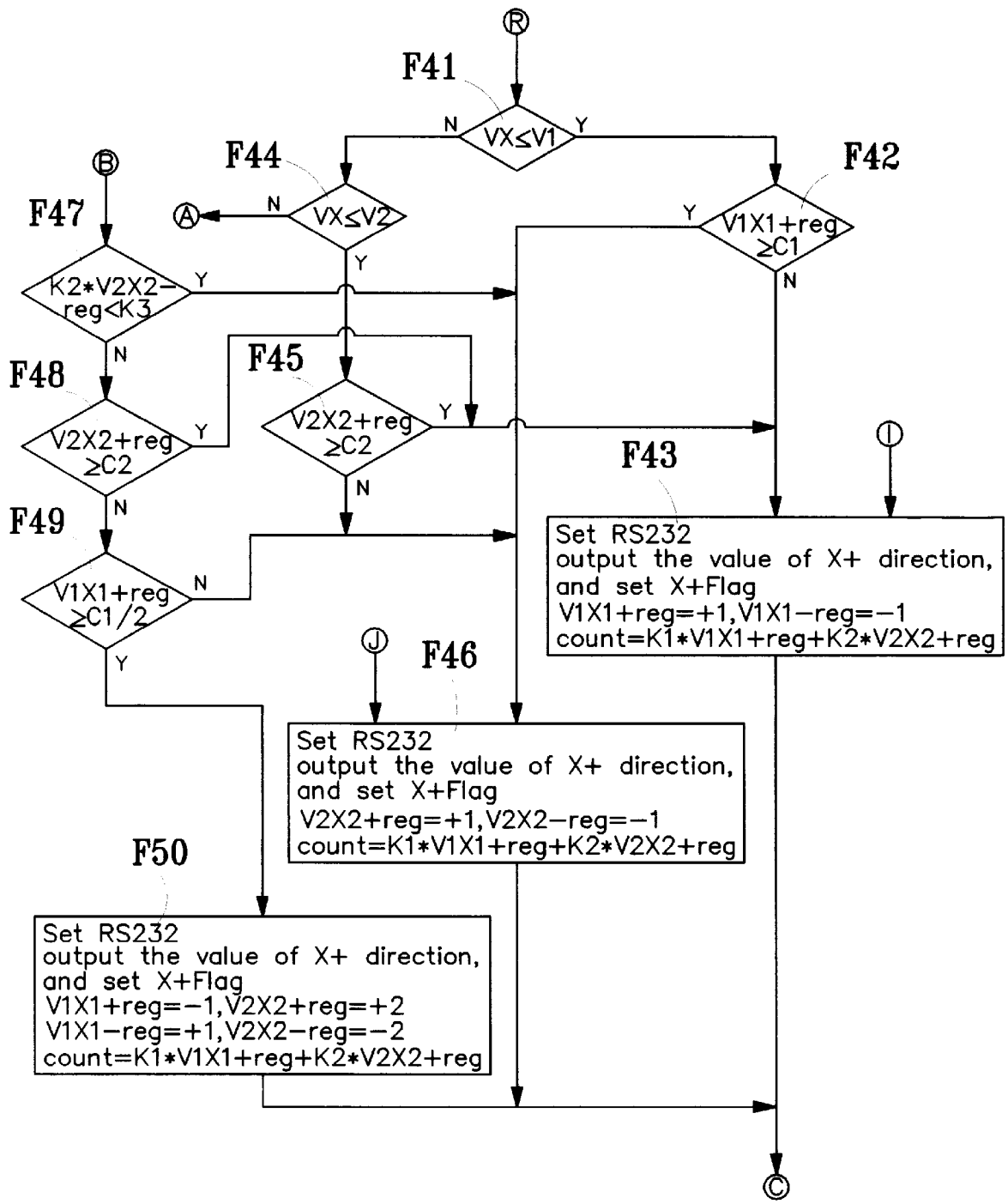
Figure 15E:
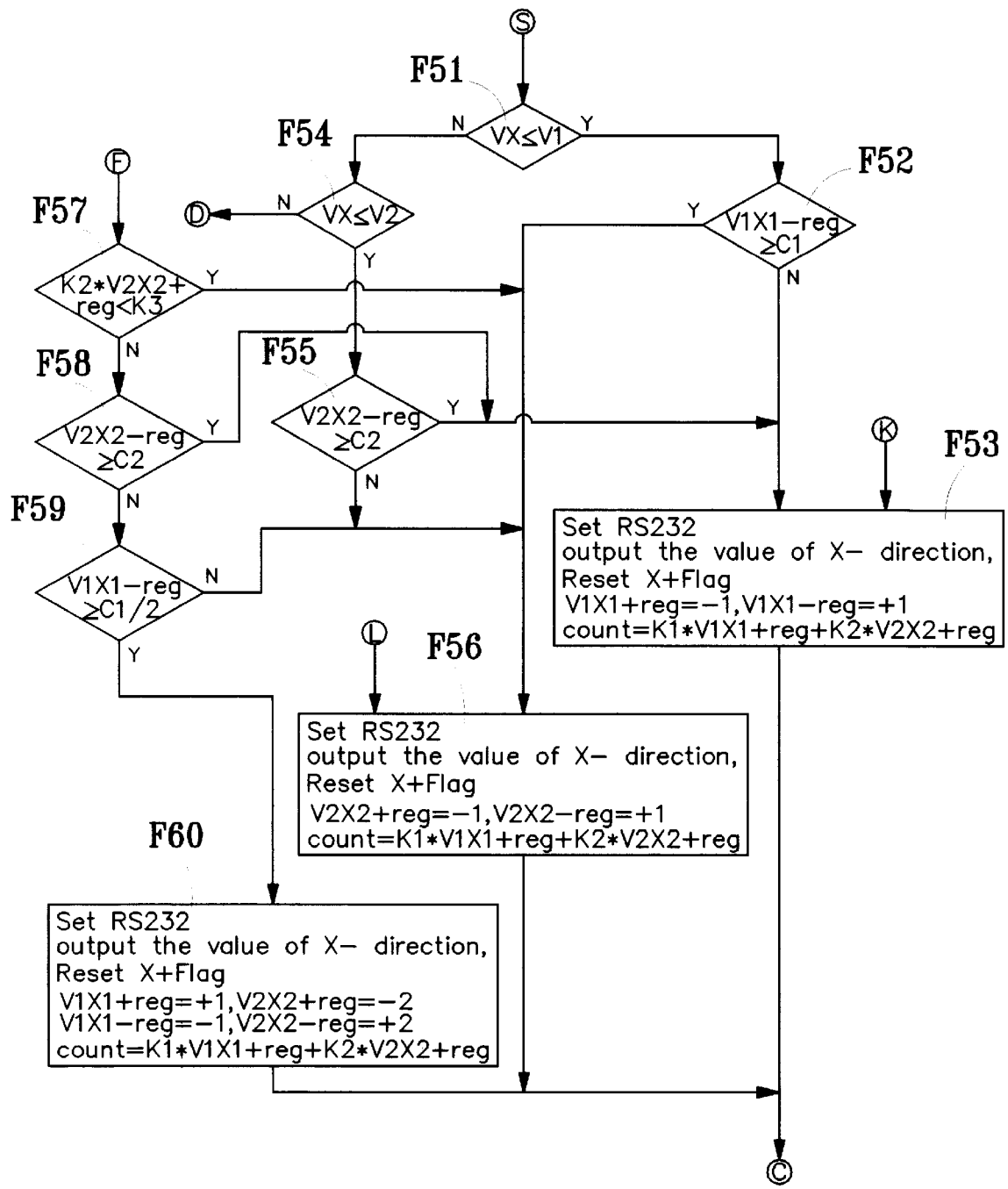

FIG. 15D is a subprogram flow chart of the control program, explaining how the cursor is moved to positive direction, while FIG. 15E is a subprogram flow chart of the control program, explaining how the cursor is moved to the other direction. The displacement of the cursor moving on the computer display is proportional to the moving distance of the finger controllable member. The factor of the proportion depends on the moving speed of the finger controllable member. The purposes of these procedures are as follows:

1. To limit the displacement of the finger controllable member to a range about 16 mm or less. Inspitefully, the movement of the cursor representing on the computer display is not effected by the shorten displacement, and the different moving speed of the finger controllable member. So, the present invention is impossible has problems of the prior art that the finger controllable member already reaches a margin of the positioning device but the cursor not reaches a corresponding margin on the computer screen; nor the finger controllable member not yet reaches a margin of the positioning device but the cursor already reaches a margin on the computer screen.
2. When the cursor on the display moves to any desired position thereon, there are necessary fine displacements around the position.
3. The moving speed and located position of the cursor on the display can always match that of the finger controllable member, resulting of a smooth, fast, and precise movement in operation.
4. The finger controllable member in each axis, for example X-axis, has two registers for positive directional performance and two registers for negative directional performance. The respective value recorded in the positive and negative registers is mutual associated, so that the finger controllable member may return to its original point and the cursor on the display may also return to its original point. The various symbols used in the control program flow chart are defined in TABLE II The VX represents the moving speed of the finger controllable member, changing among at least two different moving speeds, such as V1, V2, V3, and so on. Different proportional factor K are appointed to correspond to the different moving speeds. That is, the factor K is a constant representing that the displacement of the cursor moving on the display is proportional to the detected displacement of the finger controllable member on the effective area of the positioning device. For example, factors K1 and K2 may be various combinations, such as (1,2), (1,3), (1,4), (2,4), and so on, wherein the value of K1 and K2 may be a default value as a parameter for device driver program, which is selected by the user. It is therefore possible to determine the displacements C1 and C2 with reference to formula 1 and formula listed above, at both the first speed level and the second speed level. In a preferred embodiment, C1 and C2 may be a default parameter according to the resolution of the computer display used. When the resolution of the display is increased, the scale of the constant value K2 may be increased correspondingly, so that the cursor can be moved in a fine displacement operating mode which can match the minimum pixel displacement requirements of various display resolutions. In such case, due to K2 is increased in accordance with the increment of the display resolution, the minimum pixel displacement is correspondingly decreased. As result, the movement of the cursor on the display is very smooth.

Example:

Supposing that the display resolution at X-axis of the display is 640; the displacement of the photo encoder is about 15.68 (i.e. 196*0.08 mm);

640=(1+C1)+(4cursor2), K1=1, K2=4

196=C1+C2

C2=148,C1=48

In case that the display resolution at X-axis of the display is 1024;

1024=(1+C1)+(7cursor2), K1=l, K2=7

196=C1+C2

C2=138,C1=58

When the display resolution is increased from 640 to 1024, the distance from pixel to pixel is decreased. So, in spite of K2 being changed from 4 to 7, it will not effect the smooth performance of the cursor moving on the display. In fine operation mode, the cursor can be moved at precise displacement from pixel to pixel on the display, no matter the change of the display resolution. To reduce the distance between the optic grids C3, instade of reducing the the illumination and the distance for each lattice, the lattice number is reduced (in the prior art, it is reduced from 320 to 200), thus it is umpossible that the finger controllable member is only moved one lattice, but the display cursor is moved two or three lattice. Therefore, it is appreciated from the description hereinablve, if the finger controlling controlling element want to move within a range samaller than 16 mm from pixel to pixel, the present equation must be used, and by changing the value of recorder and the constant K, a cursor controlling device which is moved on an area of 10 mm×8 mm may be derived, another, said device may be used to control any point from the cursor to the display. In the a small movement cursor controlling device, C1=15, C2=27, and C3=113 (1×15+5×27+10×113=1280). In such a design, the distance between the optic grids of x axis =(15+27+113)×0.08 mm=12 mm, the distance between the optic grids of Y axis=1024/1280×12 mm=10 mm, thus the length of said finger controllable member may be reduced to 25 mm, or further to 20 mm to suit the operation of thumb. FIG. 15D is a subprogram flow chart of the control program, explaining how the cursor is moved to a positive direction, while FIG. 15E is a subprogram flow chart of the control program, explaining how the cursor is moved to the other direction, represented as H1 and H2 respectively in FIG. 15A. When the finger controllable member is moved in positive direction, the value stored in positive directional registers V1X1+reg and V2X2+reg will be increased. Correspondingly, the value stored in negative directional registers V1X1−reg and V2X2−reg will be decreased in accordance with the increment of the positive directional registers. When X-axis coordinate is minimum, the value stored in register V1X1+reg is 0, V1X1−reg is equal to value of C1, V2X2+reg is 0, and V2X2−reg is equal to value of C2; when X-axis coordinate is maximum, the value stored in register V1X1+reg is equal to value of C 1, V1X1−reg is 0, V2X2+reg is equal to value of C2, and V2X2−reg is 0. The moved displacement of the finger controllable member at the third speed level is transferred to temporary values V1X1+ and V2X2+ by using formulas 4 and 5 listed in TABLE III. Thereafter, the temporary values are stored in registers V1X1+reg and V2X2+reg respectively, and then the value of reference constant K3 may be calculated by using formula 2 listed in TABLE III. After these procedures, the finger controllable member may correctly return to original position, and the cursor on the display may also correctly return to original position.

For example:

K1=1, K2=4

K3=(n−1)K2−(n−2) K1=(3−1)4−(3−2)1=7

The result indicates that in case the displacement of the finger controllable member is equal 1, the movement of the cursor on display will be equal to 7. Then, the displacement of the finger controllable member at the third speed level may be transferred and stored in registers V1X1+reg and V2X2+reg by using formulas 4 and 5 listed in TABLE III.

K3*V3X3+=K2*V2X2++K1*V1X1

V3X3+=V2X2++V1X1+

7*1=4*V2X2++V1X1+

1=V2X2++V1X1+

V2X2+=+2, V1X1+=−1

It is noted, in this case, the increment of V2X2+reg is 2, and the decrement of V1X1+reg is 1.

The result indicates that the value stored in registers V2X2+reg and V1X1+reg at positive direction (i.e., V2X2+reg+V1X1+reg=2+(−1)=1) is match the real displacement of the finger controllable member at the third speed level.

Further, formula 3: (K1cursor1) +(K2cursor2) the displacement of the display K1XV1X1+reg+K2VV2X2+reg= the displacement of the display that is, (1*−1)+(4*2)=7.

It indicates the same result that the displacement of the cursor on display is equal to 7 when the finger controllable member is moved at the third speed level. The displacement of the finger controllable member at the third speed level is transferred into temporary values V2X2+ and V1X1+ by formulas 4 and 5 listed in TABLE III, and then the temporary values are stored in registers V2X2+reg and V1X1+reg respectively.

It is obviously that the moving speed and positioning of the cursor on display may match that of the finger controllable member in accordance with the present invention, with advantage of smooth, fast, stable, and precise moving performance. The cursor positioning device of the present invention is provided with two positive directional registers and two negative directional registers. The value stored in the positive directional registers and the negative directional registers is always mutual associated, so that the finger controllable member may correctly return to original position, and also the cursor may correctly return to original position correspondingly.

It is noted that since the finger controllable members of the positive directional registers and the negative directional registers on X axis are mutual association. The definition of the positive directional registers and the negative directional registers in X axis is only for the purpose of better understanding. Alternatively, it is also possible to use two positive registers to achieve the same performance.

After the main program finishes the determination procedure in direction X+ as described above, the procedure determines whether VX is less than or equal to a predetermined reference speed in step F41 of FIG. 15D. If yes, it indicates the speed of the finger controllable member is less than a lower limit speed V1, i.e. the first speed level. In step F42, it further determines whether the value stored in register V1X1+reg of the first speed level is larger than or equal to a constant C1. If no, the displacement of the cursor is set to be proportional to that of the finger controllable member times a constant K1, and then in step F43 increasing the value of V1X1+reg, decreasing the value of V1X1−reg, and transmitting the value to computer. If the value stored in register V1X1+reg of the first speed level is larger than or equal to a constant C1, it indicates the V1X1+reg reaches a maximum value. In such a case, the displacement of the cursor will be set to be proportional to that of the finger controllable member times a constant K2, and then in step F46 increasing the value of V2X2+reg, decreasing the value of V2X2−reg, and transmitting the value to computer.

If the result in step F41 is no, it indicates that the finger controllable member is at an upper limit of the reference speed V1. In step F44, it further judges whether VX is at an upper limit or at a lower limit of the reference speed V2. In case VX is at an lower limit of V2, a step F45 is performed to judge whether the value stored in the register V2X2+reg is maximum value or not. If yes, the displacement of the cursor will be set to be proportional to that of the finger controllable member times a constant K1; if no, the displacement of the cursor will be set to be proportional to the displacement of the finger controllable member times a constant K2.

In case that only three speed levels are presented in the cursor positioning device, the terminal symbols A and B are combined together. In this case, if the result in step F44 is no, the step F47 is performed to read the left count remained in the positive register V2X2+reg. If the value of K2*V2X2–reg is less than that of K3, the displacement of the cursor will be set to be proportional to that of the finger controllable member times a constant K2, and then the procedure flows to step F46 to avoid a situation that the cursor value exceeds over the display margin when the performing speed of the cursor positioning device exceeds that of the reference speed V2. This also avoid a problem that the cursor does not return to original position. If the result in step F47 is no, the step F48 is performed to judge whether the register V2X2+reg is larger than or equal to a maximum value. If yes, the displacement of the cursor will be set to be proportional to that of the finger controllable member times a constant K1; if no, it indicates that the register V2X2+reg remains left value and the displacement of the finger controllable member in positive direction at the third speed level can be transferred and stored in the register V1X1+reg and V2X2+reg. Then, in step F49, the procedure judges whether the amount of fine displacement in positive direction exceeds a half of the distance. If no, step F46is performed to set the displacement of the cursor proportional to the displacement of the finger controllable member times a constant K2; if yes, the procedure flows to step F50, decreasing the value of V1X1+reg , increasing the value of V1X1–reg, adding the value of V2X2+reg by 2, decreasing the value of V1X1–reg, and subtracting the value of V2X2–reg by 2. Under this procedure, when the finger controllable member is operating at the third speed level, the register V1X1+reg remains a value that is half of the constant C1. As result, when the cursor is moved to any position on the display, there are fine displacements always around the position where the cursor presents.

The speed parameter VX of the finger controllable member of FIG. 15D is divided into three speed levels, i.e. $0<VX<=V1$, $V1<VX<=V2$, and $VX>V2$. Alternatively, the speed parameter VX may be divided into two speed levels, still remaining good performance described above and applicable to the most procedures of FIG. 15D. In this alternative embodiment, if the answer in step F41 is no, the step F47 is performed, neglecting steps F44 and F45. It means that the speed levels V1 and V2 are set to be similar or the same value. So, the second speed level will be neglected when the finger controllable member judges the value of VX. It is also possible to detect the situation of the cursor positioning device such as key switch 13a shown in FIGS. 14, with amendment to the firmware. In such a design, the user simply clicks the switch to enable the cursor positioning device operating at the first speed level. If the user clicks the switch again, the cursor positioning device can operates at the third speed level. In the third speed level, it is permitted to move the cursor on the display in fast moving operation mode. Furthermore, the movement of the cursor on the display may be according to the velocity increment of the finger controlling element on a cursor area, namely, the velocity increment of said finger controlling element is used to substitute the velocity of said finger controlling element.

FIG. 15E is a subprogram flow chart of the control program, explaining how the cursor is moved to the other direction, the control flow of which is similar to that of FIG. 15D may correctly return to original position correspondingly.

Figure 17A:
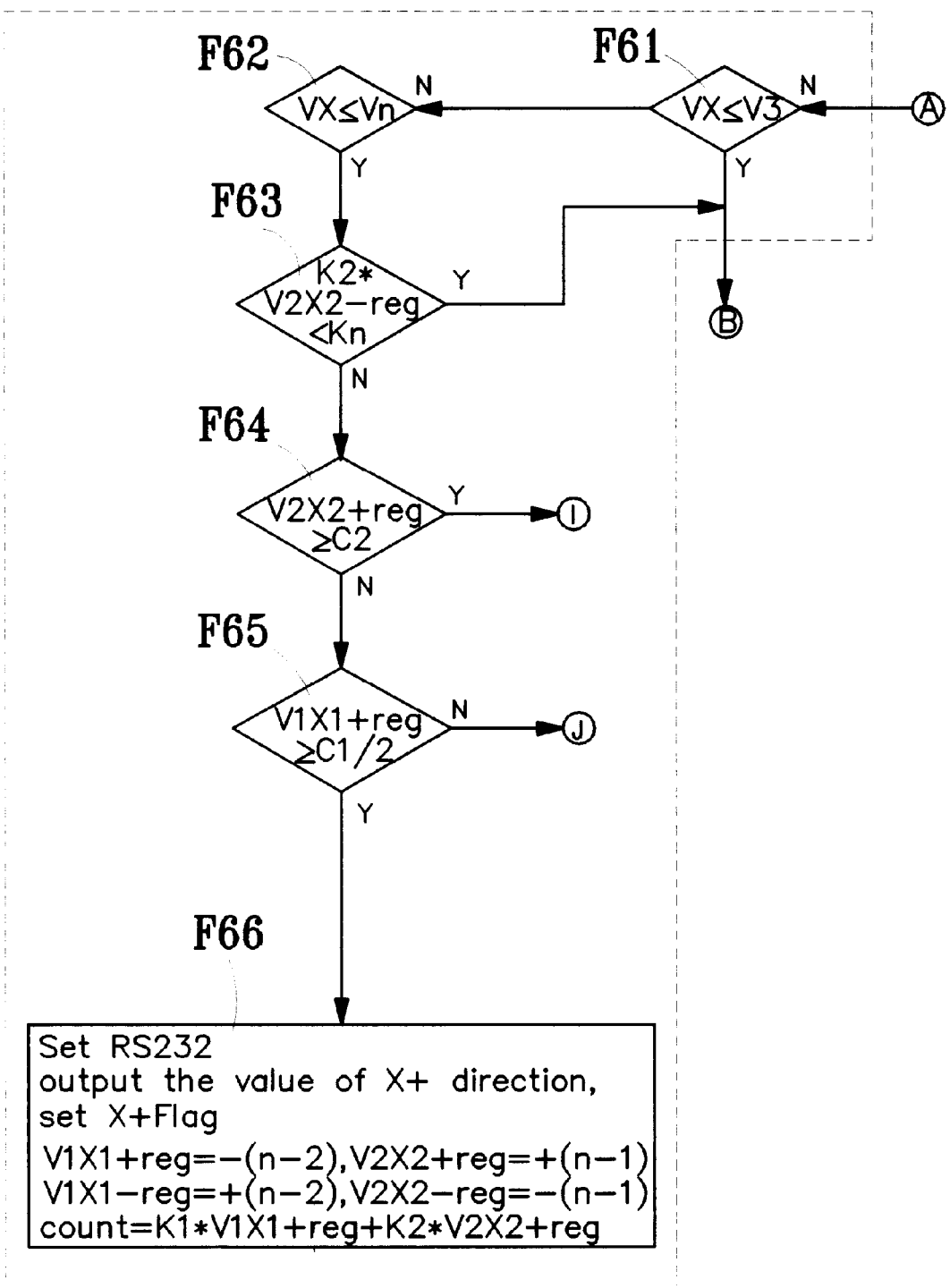
FIG. 17A is the flow diagram for the H1 subprogram of FIG. 15D.
Figure 17B:
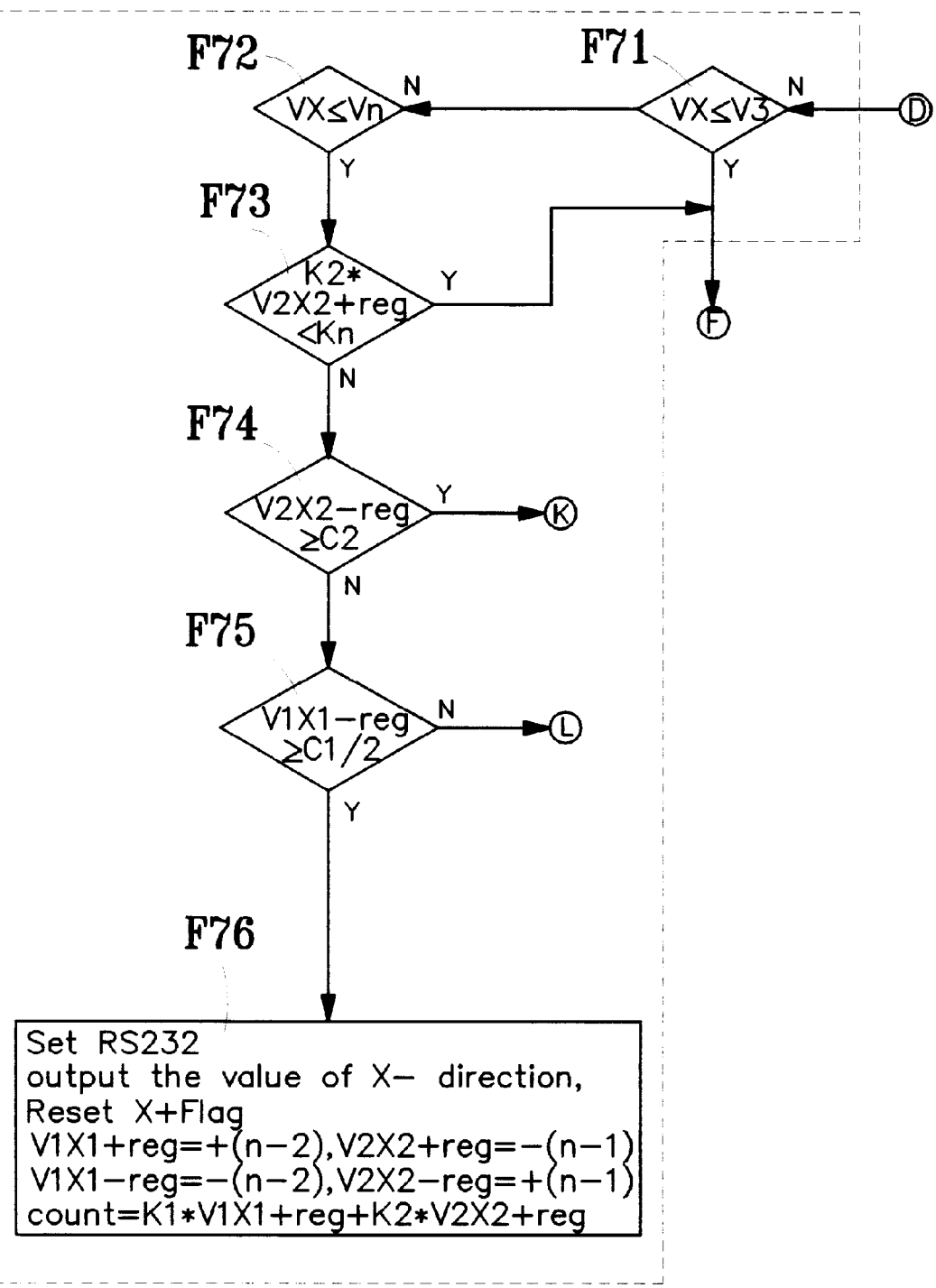
FIG. 17B is the flow diagram for the H2 subprogram of FIG. 15D.
Figures 18A, 18B:
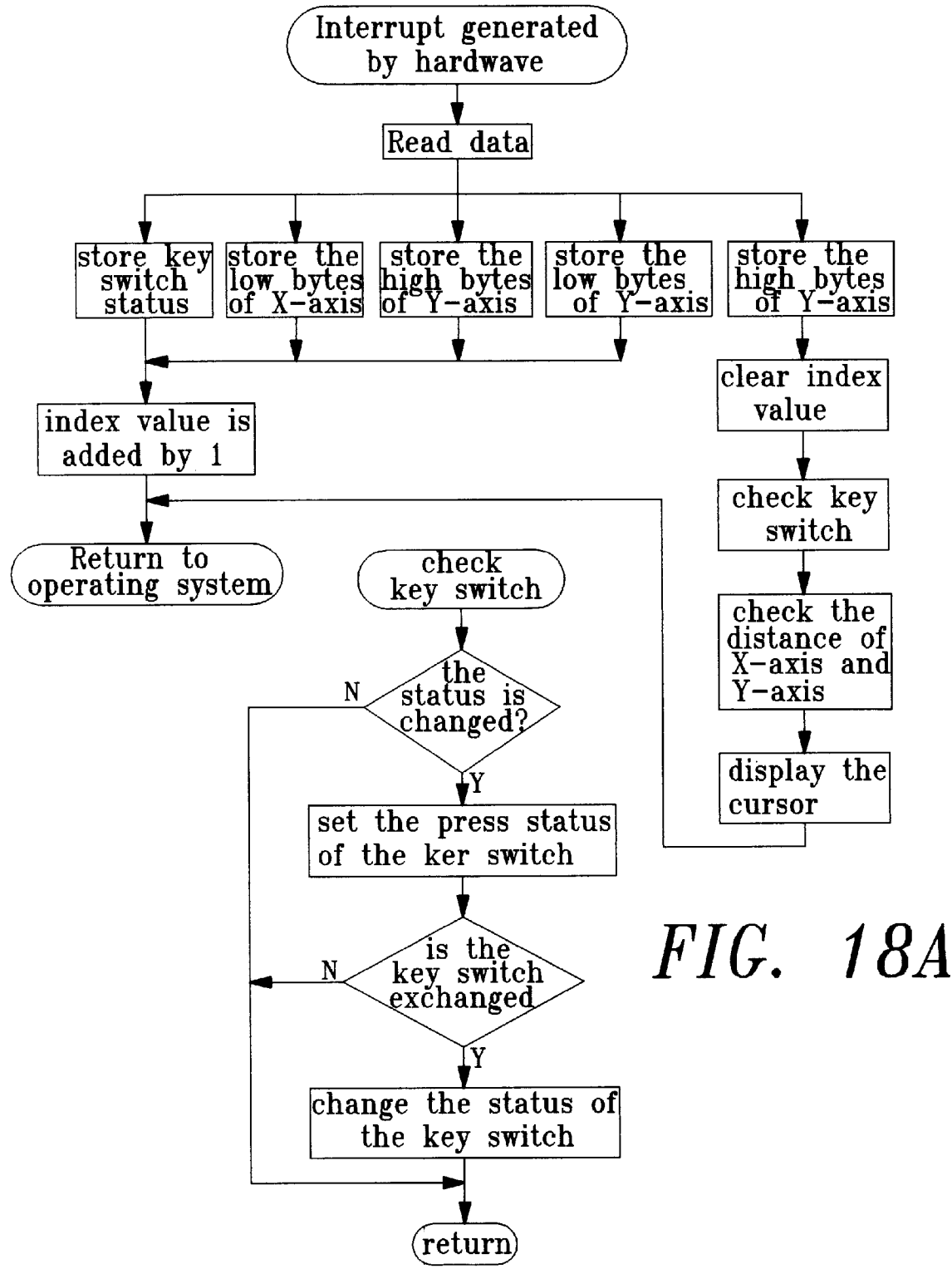
FIGS. 18A–D is the driving program of the computer.
Figures 18C, 18D:
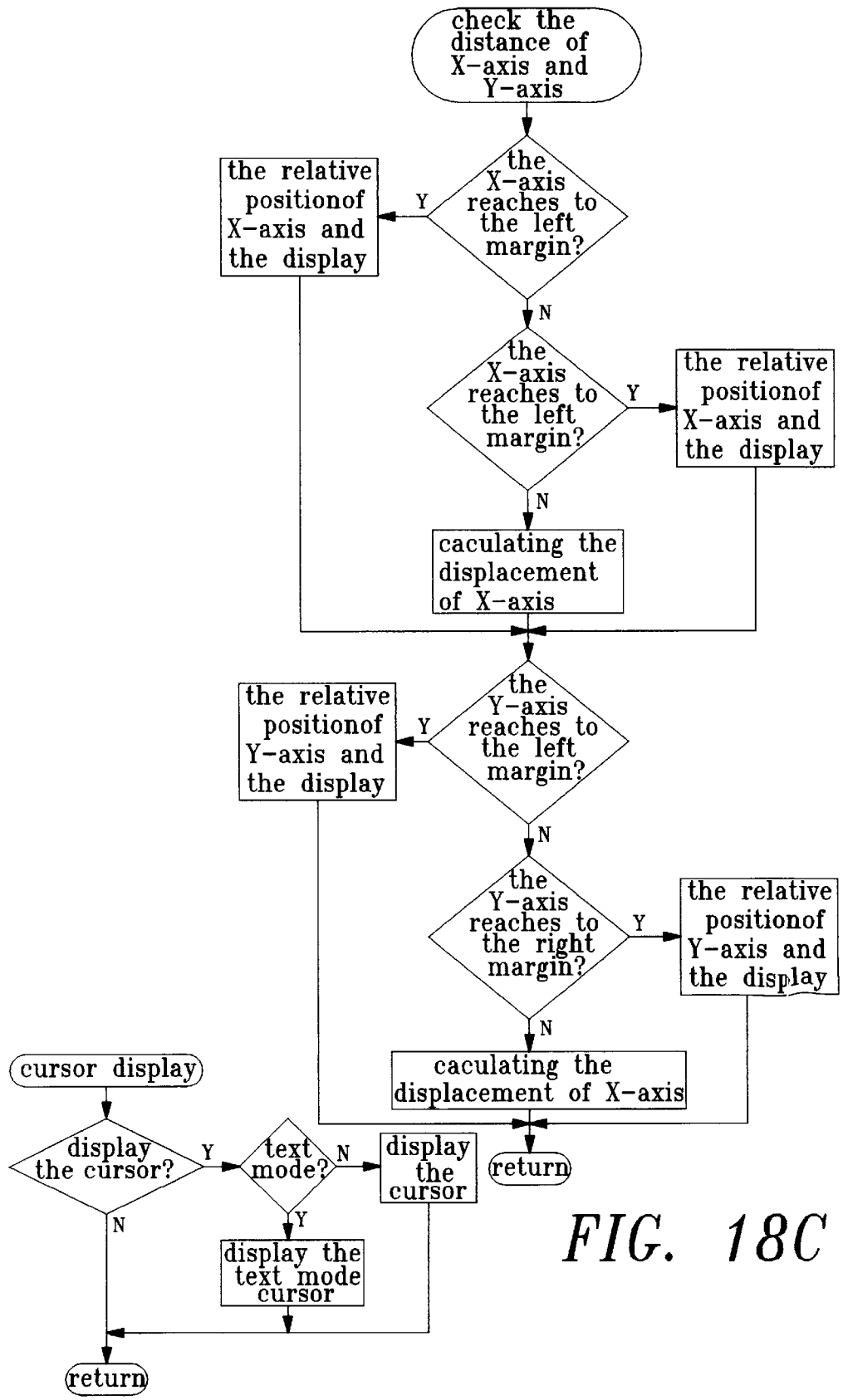

FIG. 17A is a speed detecting procedure in positive direction, including various speed detecting subprograms. The terminals A and B are connected to corresponding terminals A and B of FIG. 15D. In case that the result in step F44 is no, the procedure flows to step F61 of FIG. 17A; if the result in step F61 is yes, the procedure flows to step F47 of FIG. 15D. It is noted that the speed VX in positive direction uses the same control procedure at the third speed level, the forth speed level, and higher speed level. In step F63, it detects whether the cursor is over the margin of the display. If yes, the speed will be changed to a lower speed level to further judge whether the cursor is over the margin again. The next step F64 is performed only until the cursor does not exceed the margin. In step F64, it judges whether the register V2X2+reg is a maximum value. If yes, the procedure returns to step F43; if no, the procedure flows to step 65. In step F65, it judges whether the register V1X1+reg is larger than a half of the value C1. If no, the procedure flows to step 46; if yes, the procedure returns to step F66. At this time, the high speed value of the cursor poisoning device, for example at the third speed level or higher speed, is transferred into temporary values X2X2+and V1X1+, and then storing the temporary values into the registers V2X2+reg and V1X1+reg respectively. As result, the moving speed and positioning of the cursor on display may match that of the finger controllable member with advantage of smooth, fast, stable, and precise moving performance. FIG. 17B is a speed detecting procedure in negative direction, the control flow of which is similar to that of FIG. 17A.

The Y-axis procedure is followed by the X-axis procedure, with similar control flow described above.

Figure 16:
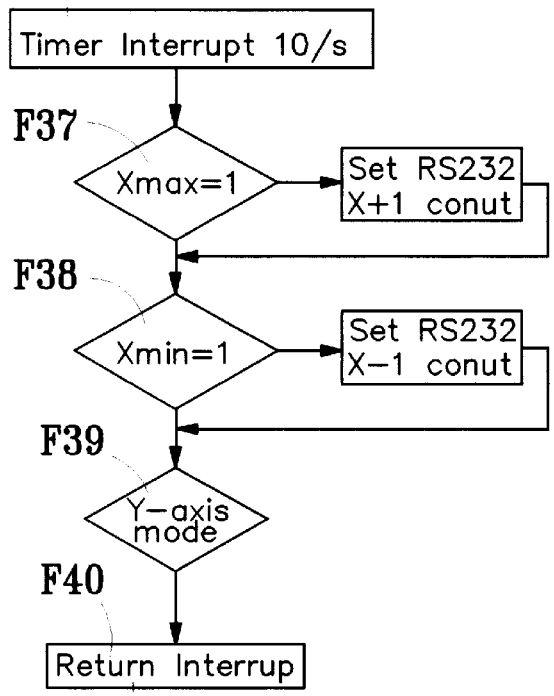
FIG. 16 is the flow diagram for the boundary interruption program.

As shown in FIG. 16, the process of said finger controlling element is terminated on the boundary, wherein the Xmax and Xmin generats ten interrupting signals per second, and subsequently, the Y axle mode is judge and then the process is restored.

Referring to FIGS. 1 to 5, the embodiment one of this invention includes an upper case 10, a center body 20 and a lower case 30.

The upper case 10 includes an upper case cover 11 and an upper case base board 12. The upper case cover 11 has three input keys 111 located in the left, center and right positions, and a pair of locking lugs 112 for engaging with a pair of locking slots 122 located in the upper case base board 12. The upper case base board 12 further has three contact switches 121 located under the three input keys 111.

The center body 20 includes a cover 21 and a base 22 which has a circular disk bottom and has an engaging means for locking the cover 21. Between the cover 21 and the base 22, there are provided with a X-axis sliding bar 23 and a Y-axis sliding bar 24 which are served respectively as a X-axis movable optic grid and a X-axis movable optic grid. On the X-axis movable optic grid 23, there is provided with a transparent and opaque X-axis photo grid zone 231, and a X-axis sliding block 232 on each of the two ends. Y-axis movable optic grid 24 also has a transparent and opaque Y-axis photo grid zone 241, and Y-axis sliding blocks 242 at both ends. Inside the cover 21, there are two light emitting diodes 211, 212. In the base 22, there are a X-axis photo transistor 221 and a Y-axis photo transistor 222 each of which has respectively a stationary photo grid 2211 and 2221 disposed thereon. In an upward peripheral flange an the base 22, there are two pairs of U-shaped slots 223 and 224 allowing the X-axis movable optic grid 23 and Y-axis movable optic grid 24 to slide therethrough respectively. Under the base 22, there are snap hooks 225.

The lower case 30 includes a lower case cover 31 and a lower case base board 32 with a control circuit board 33 located therebetween and screwed together. The lower case cover 31 and the circuit board 33 have a circular opening 311 and 331 formed in the center. The circuit board 33 has electronic components such as resistors, capacitors, inductors, transistors and integrated circuits (ICs) disposed thereon. The four corners of the circuit board 33 are cut away to form notches. The lower case base board 32 has a plural number of curve-shaped concave slots 321 to form a substantially annular ring.

Figure 1:
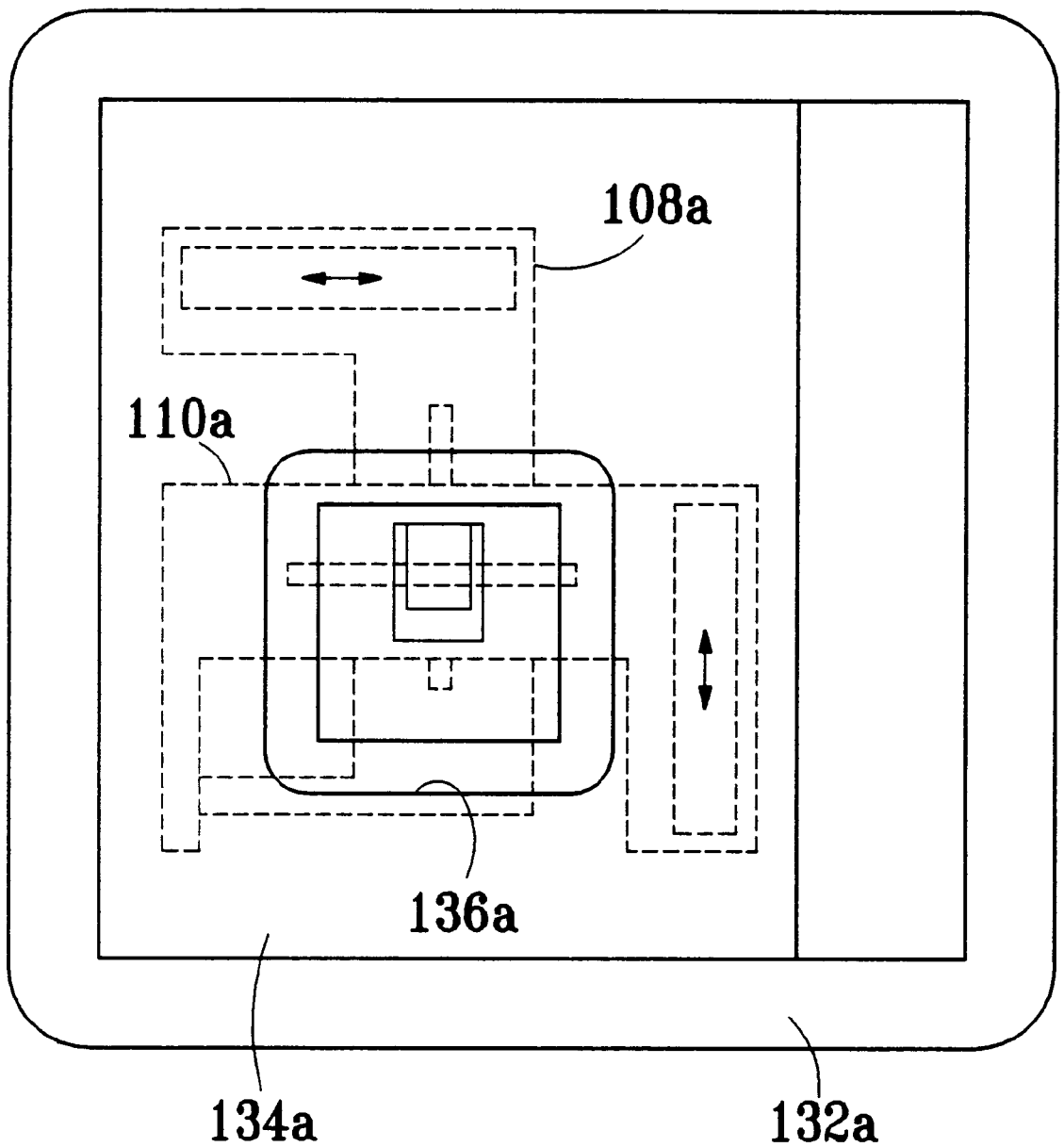
FIG. 1 is a schematic view of the computer input device of the prior art.
Figure 2:
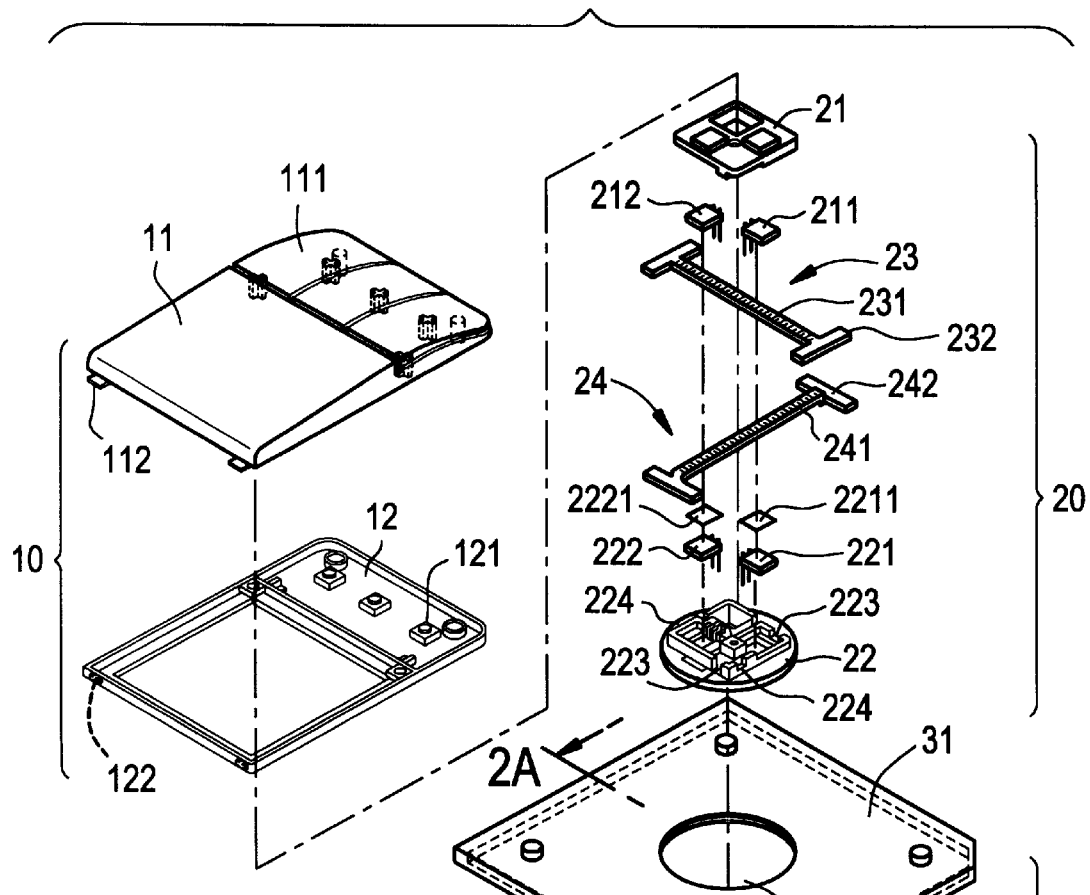
FIG. 2 is a exploded view of the components of the first embodiment of the present invention.
Figure 2A:
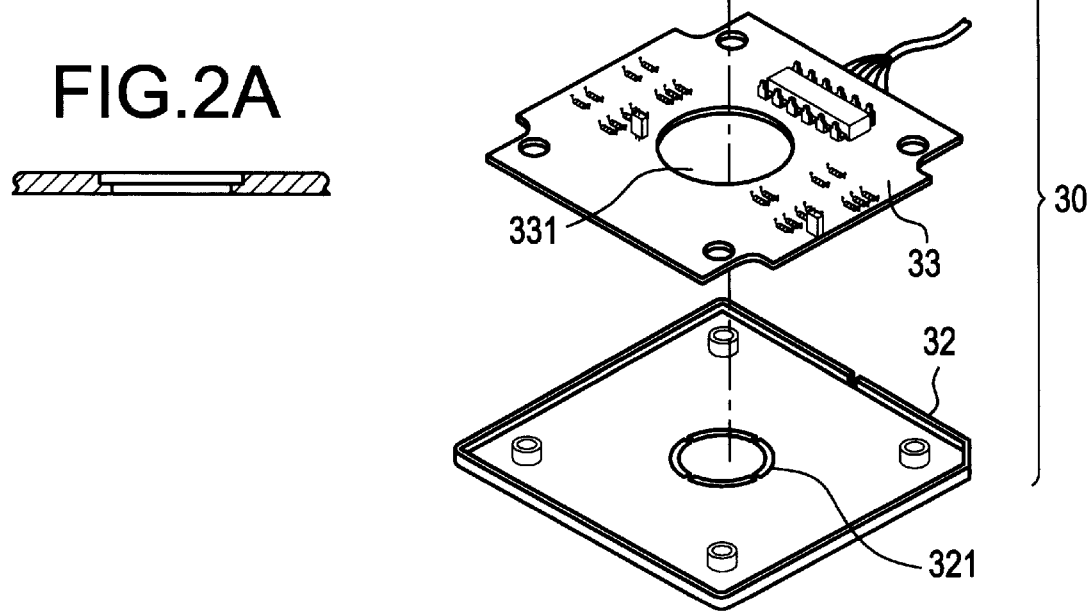
Figure 3:
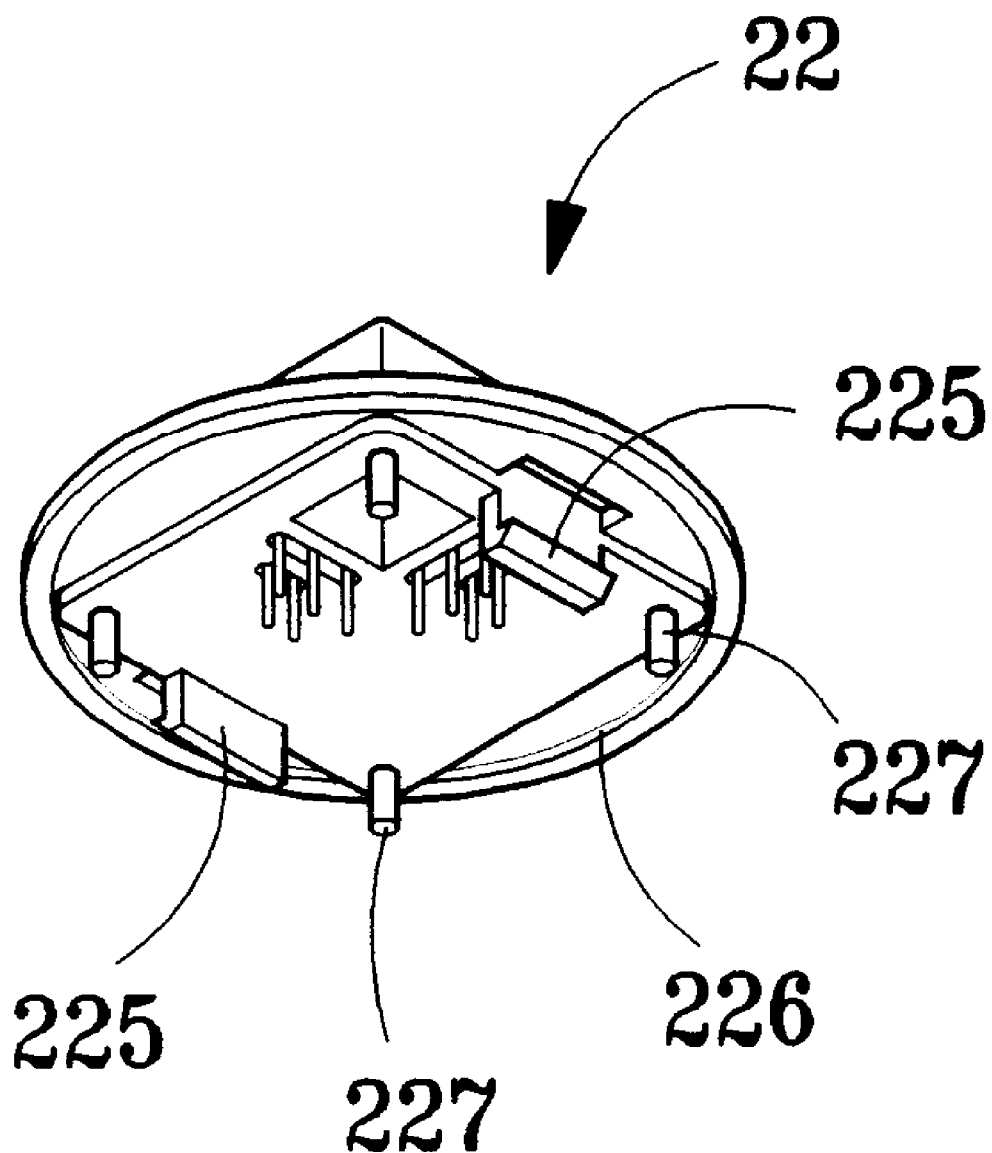
FIG. 3 is a elevational perspective view of the base of the central body in the first embodiment of the present invention.
Figure 4:
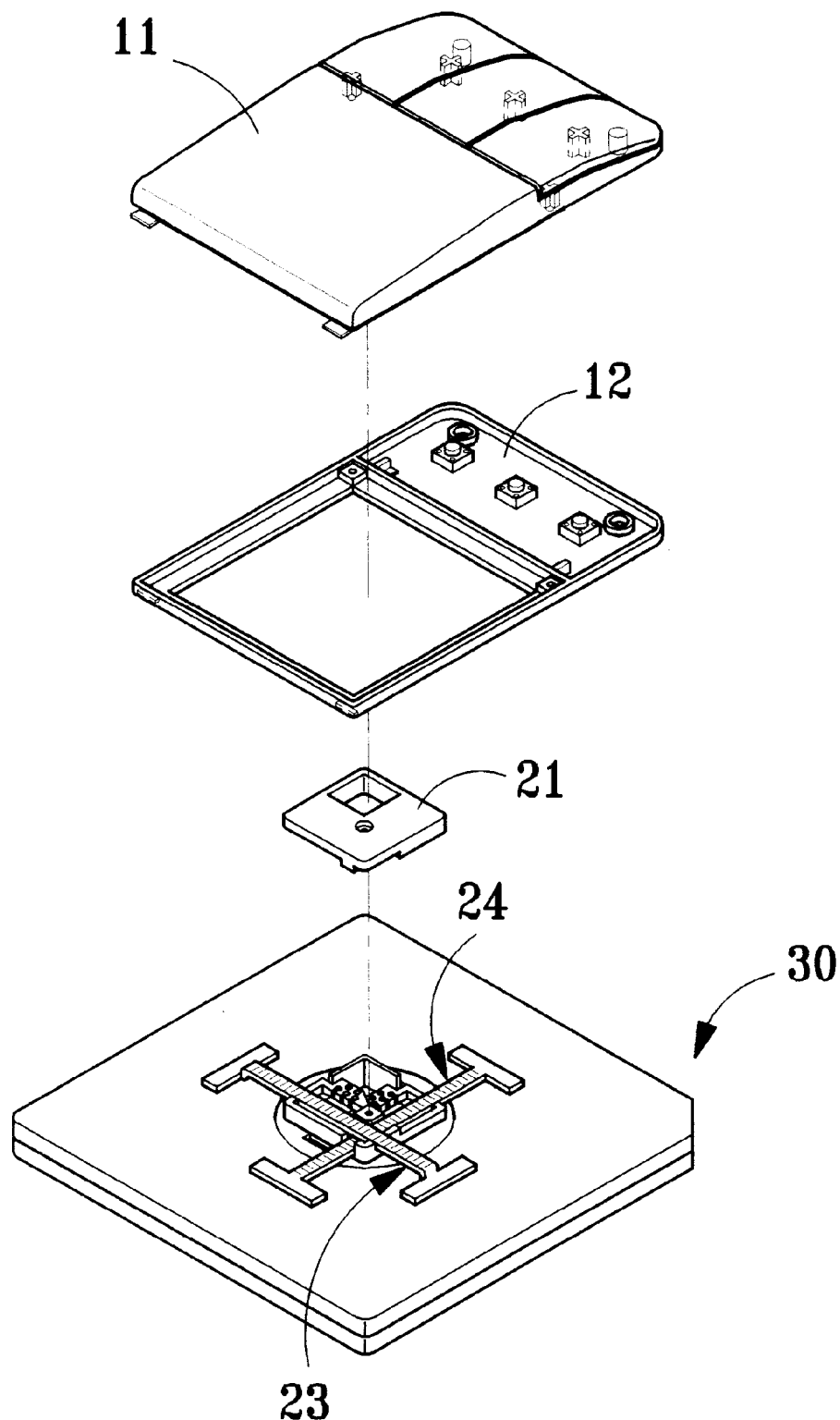
FIG. 4 is a partial assembly perspective view of the first embodiment of the present invention.
Figure 5:
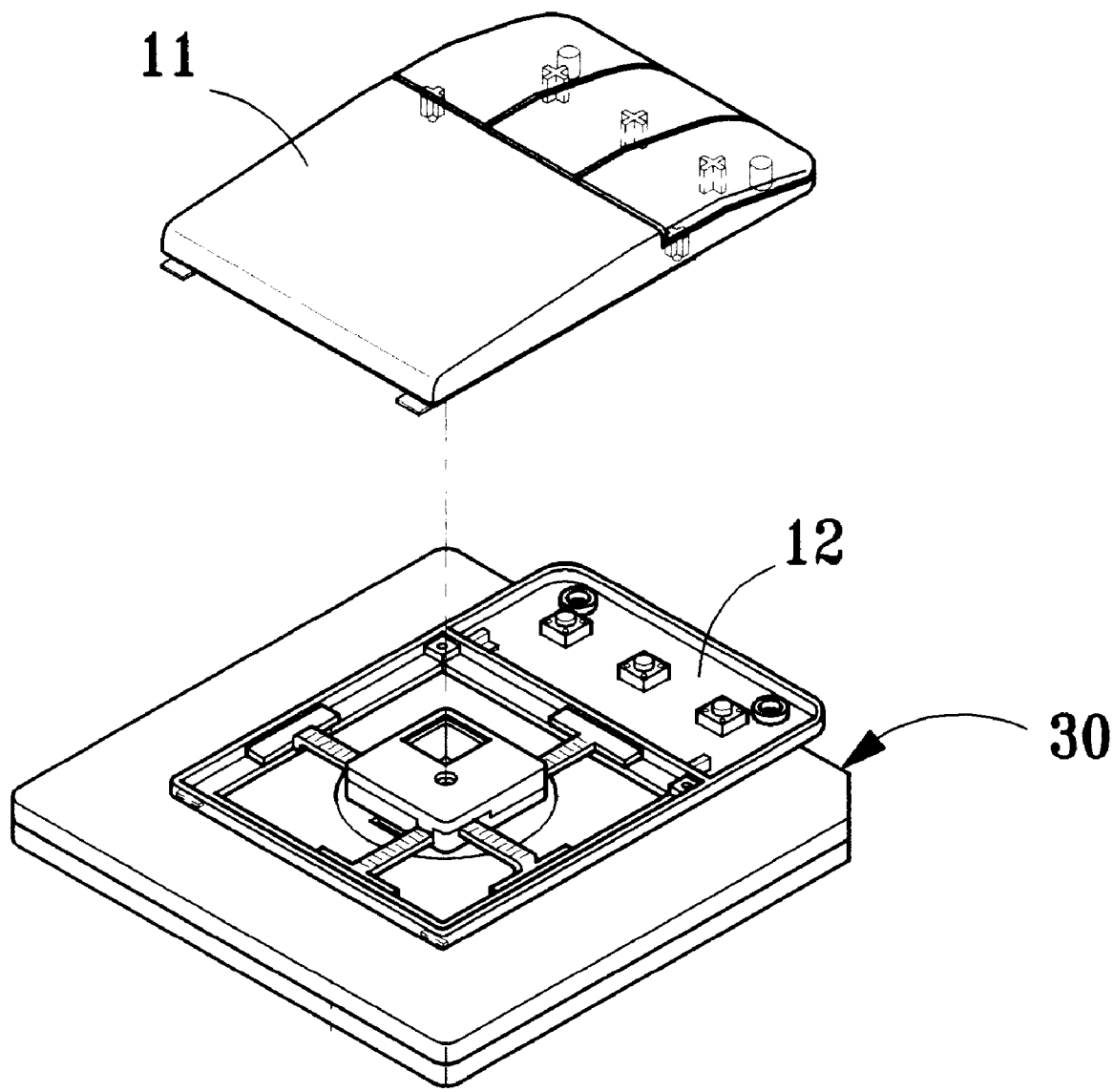
FIG. 5 is a partial assembly perspective view of the first embodiment of the present invention.
Figure 6:
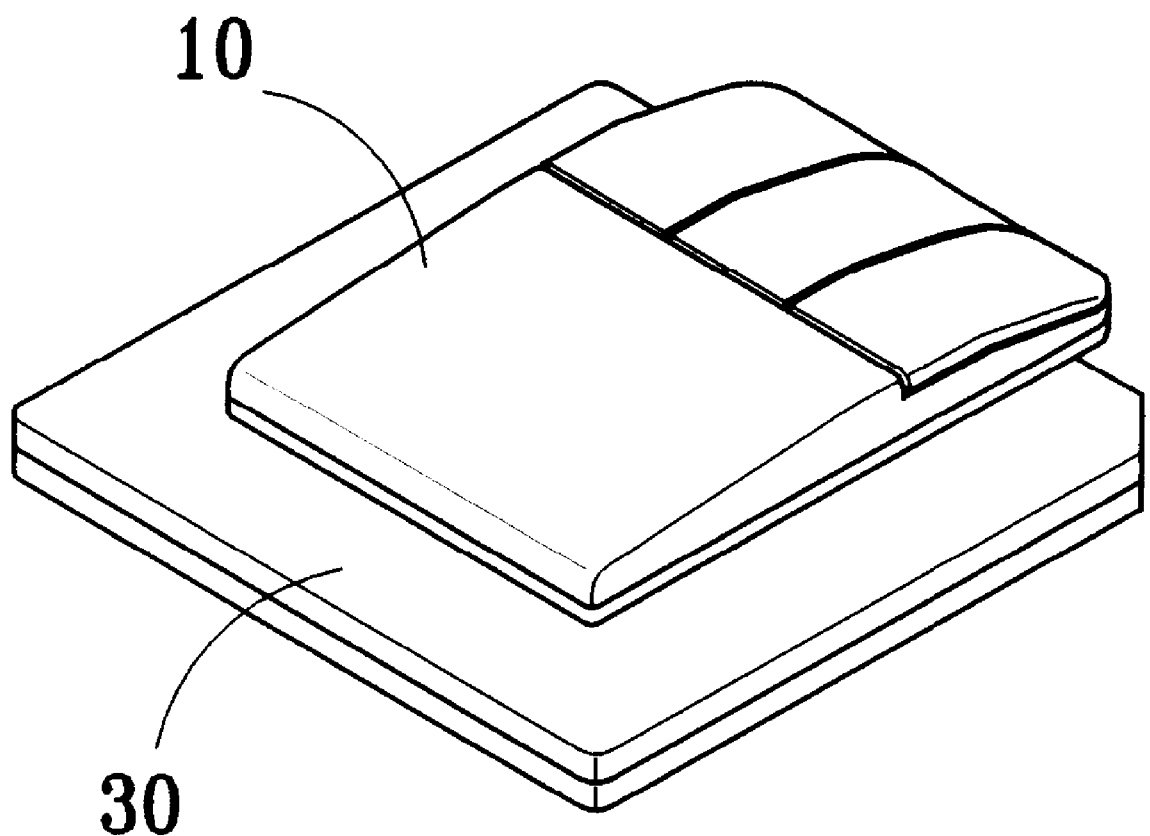
FIG. 6 is the assembled perspective view of the first embodiment of the present invention.

When in use, the X-axis sliding bar 23 and the Y-axis sliding bar 24 can be sildably moved respectively through the slots 223 and 224 without interfering with each other as shown in FIG. 1 A—A of the slots cross section. The lower case cover 31 also has a circular opening 311 in the center. The circular opening 311 has a smaller diameter at the lower portion than the upper portion.

In the first embodiment of the present invention, the circular disk base 22 is disposed in the circular opening 311 and the top surface of the disk is equal to or lower than the top surface of the lower case cover 31. The disk base 22 further has a protrusive circular body 226 formed below the bottom surface for reducing the friction when the disk base 22 is rotating. The snap hook 225 under the disk base 22 could engage with the opening 311 and thus preventing the base 22 from separating with the lower case cover 31. The bottom of the hooks 225 may be slidably moved in the concave slot 321 of the lower case base board 32.

In the first embodiment of the present invention, under the disk base 22, there are a plural number of studs 227 which can be slidably moved in the concave slot 321. Thus the concave slot 321 of the lower case base board 32 may be used to control the rotation angle of the center body 20.

As an alternative, the stud 227 may be disposed on the lower case base board 32 while the concave slot 321 may be formed under the bottom of the disk base 22 of the center body 20.

Figure 7:
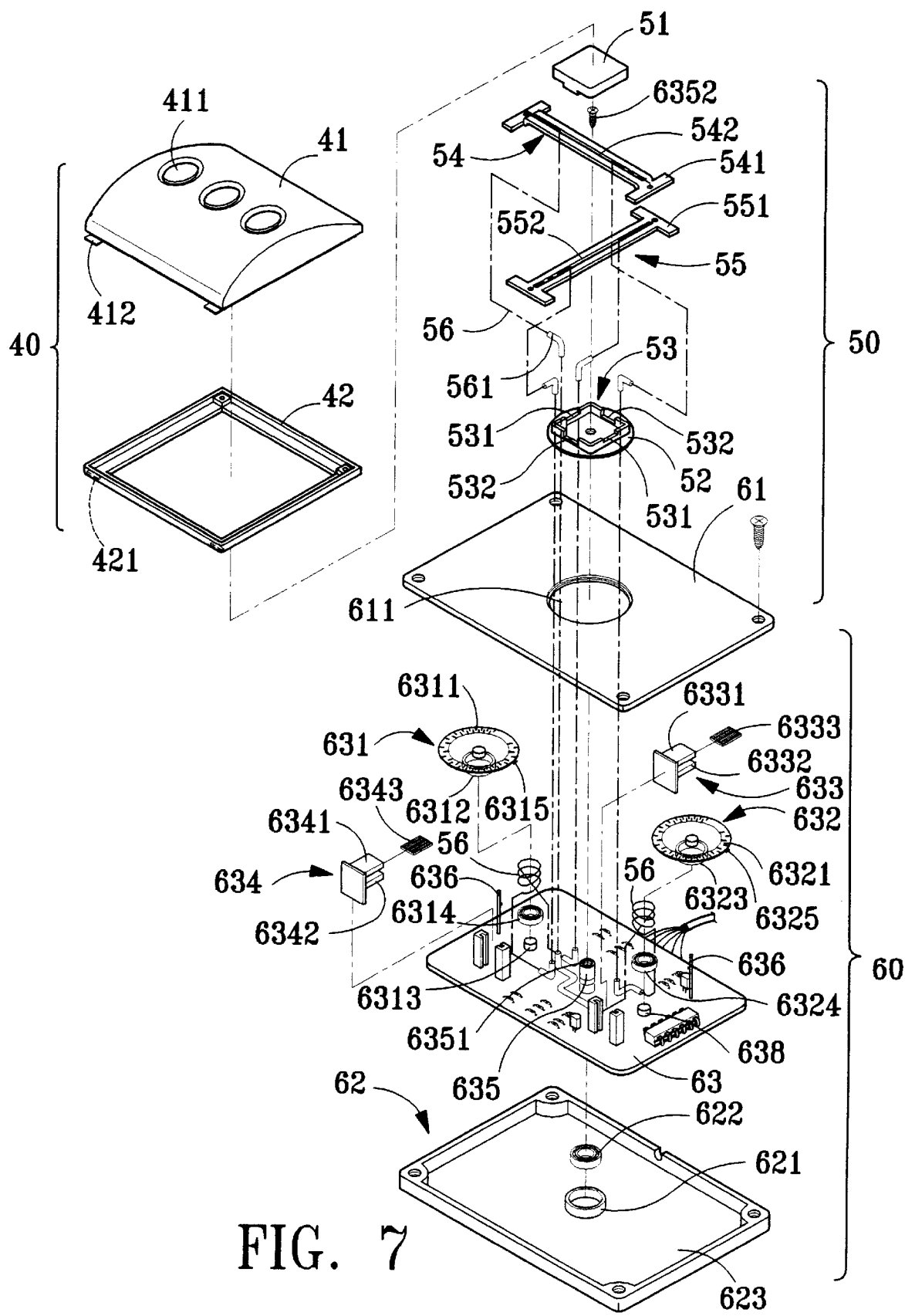
FIG. 7 is a exploded view of the components in the second embodiment of the present invention.

FIG. 7. shows embodiment two of this invention. It includes a upper case 40, a center body 50 and a lower case 60.

The upper case 40 includes an upper case cover 41 and an upper case base board 42. The upper case 41 has three input keys 411 aligning in left, center and right, and a pair of locking lugs 412 engageable with a pair of locking slots 421 located in the upper case base board 42.

The center body 50 include a cover 51 which is formed in substantially square shape and a base 52 which has concave slot means 53 an the top engageable with the cover 51, and a circular disk at the bottom.The concave slot means 53 has four peripheral upward flanges each has an U shape slot 531,532 formed therein respectively and being symmetrically faced each other. Between the cover 51 and the base 53 there is a X-axis sliding bar 54 slidably moveable through the slots 531, and a Y-axis sliding bar 55 slidably moveable through the slots 532. The X-axis sliding bar 54 and the Y-axis sliding 55 has respectively a pair of sliding blocks 541 and 551 at two ends there of, and has respectively a linear slot 542 and 552 formed in the top axially for housing a rope 56 therein. The X-axis sliding bar 54 and Y-axis sliding bar 55 are linked respectively via the rope 56 to a X-axis movable optic grid 631 and a Y-axis movable optic grid 632 located in a control circuit board 63. The rope 56 is shielded in a protection tube 561.

The lower case 60 includes a lower case cover 61 and a lower case base board 62 with the control circuit board 63 located therebetween. The lower case corer 61 and the lower case base board 62 are screwed together. The lower case base board 62 has a bearing 622 housed in a bearing seat 621 located in the center of the bottom and has concave bottom space 623 for housing the control circuit board 63. The control circuit board 63 includes ① a X-axis movable optic grid 631 which has transparent and opaque photo grid zone 6311 located therein, and a hollow shaft 6312 concentrically disposed thereon. The hollow shaft 6312 has the rope 56 winds around thereof for rotating the X-axis movable optic grid 631. The hollow shaft 6312 is engaged with a shaft 6313 and a bearing 6314 located on the control circuit board 63. Said rope 56 is enclosed by a protecting tube 561.

② A Y-axis movable optic grid 652 has transparent and opaque photo grid zone 6321 located therein, and a hollow shaft 6322 concentrically disposed thereon. The hollow shaft 6322 has the rope 56 winds around thereof for rotating the Y-axis movable optic grid 632. The hollow shaft 6322 is engaged with a shaft 6323 and a bearing 6324 located on the control circuit board 63, said rope 56 is enclosed by a proteting tube 561.

③ The X-axis photo electric means 633 has a light emitting diode 6331 located thereabove and a photo transistor 6332 located thererbelon. The photo transistor 6332 has a stationary photo grid 6333 disposed thereon. The photo electric means 633 further has a central slot formed therein for the X-axis movable optic grid 631 to slide therethrough.

④ The Y-axis photo electric means 634 has a light emitting diode 6341 located thereabove and a photo transistor 6342 located therebelow. The photo transistor 6342 has a stationary photo grid 6343 disposed thereon. The photo electric means 634 further has a central slot formed therein for the Y-axis movable optic grid 632 to slide therethrough.

⑤ The spindle 635 has a screw hole 6351 in the center for screwing the base 52 of the center body 50 thereon with a screw 6352. The spindle 635 engages with the bearing 622 and bearing seat 621 of the lower case base board 62.

⑥ Circuit componets shch as resistors, capacitors, inductors, transistors, and integrated circuits.

A positioning device of computer cursor may be assembled form said structures (1), (2) and (3).

When in use, the X-axis sliding bar 54 and Y-axis sliding bar 54 can be placed in the slot 53 of the concave slot means 53 without interfering with each other. The sliding blocks 541 and 551 of the X axis sliding bar 54 and the Y axis sliding bar 55 has a cambered shape for reducing the friction force in movement. As shown in the cross section A—A of FIG. 2, the lower case cover 61 has a circular opening 611 in the center which has a smaller diameter in the lower portion than the upper portion. The rope 56 is fixedly engaged with the hollow shafts 6312 and 6322 of the X-axis movable optic grid 631 and Y-axis movable optic grid 632.

FIGS. 13A to 13D show a preferred photo encoder structure suitable to be used in the positioning device of the second embodiment. Wherein, X axis movable optic grid 4 has a circular shape. One end thereof is formed as a transparent section 4c1, while the other end thereof is formed as a mask section 4c2, for the purpose of determining the left margin Xmin and the right margin Xmax. In addition, the X axis movable optic grid 4 is composed of two circular patterns, the outer circular pattern is used to generate the signal XA and the inner circular pattern is used to generate the signal XB. The margin signals in a digital form may be directly generated by detecting the movable photo encoder, so that the control program of the cursor positioning device is rather simple.

Here are a plurality of nose points are installed on the rim portion of the movable optic grid of the second embodiment of the present invention, while a stopping cylinder is installed on the control circuit board for controlling the rotating angle of said movable optic grid.

In the second embodiment of the present invention, a rope may be used to rotate the X-axis and Y-axis movable optic grids, and thus can reduce the size of the movable optic grids and the overall size of the cursor positioning apparatus.

Figure 8:
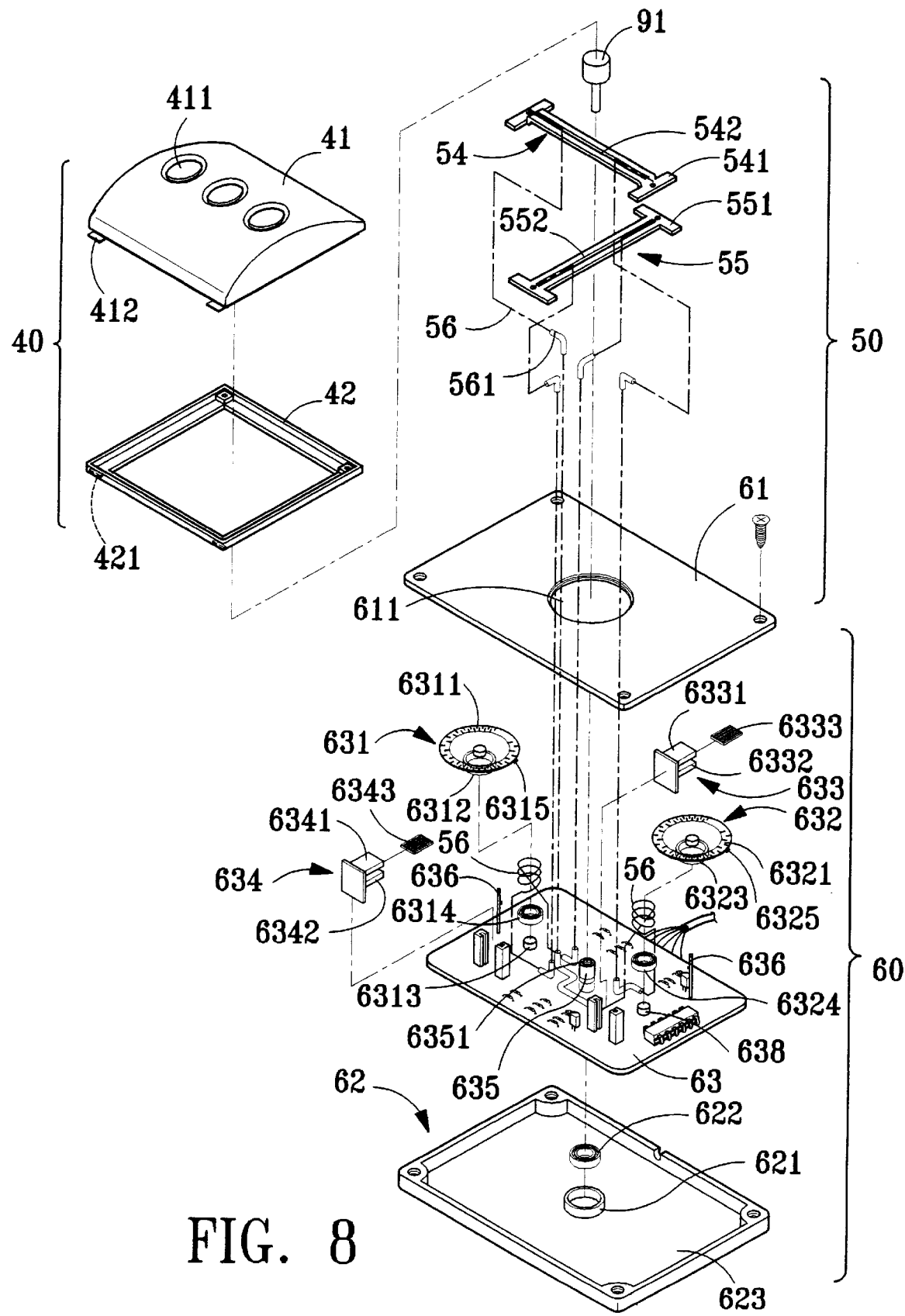
FIG. 8 is a structural view wherein the central body of the second embodiment of the present invention is substituted by a cylinder.

A cylinder 91 may be used to substitute the central body 50 of the second embodiment of the present invention, as shown in FIG. 8. In such a design, not only the thickness of the overall structure is reduced, but also it may be installed on a notebook computer, thus the controlling of movement of cursor may be attained by controlling said cylinder.

Figure 9A:
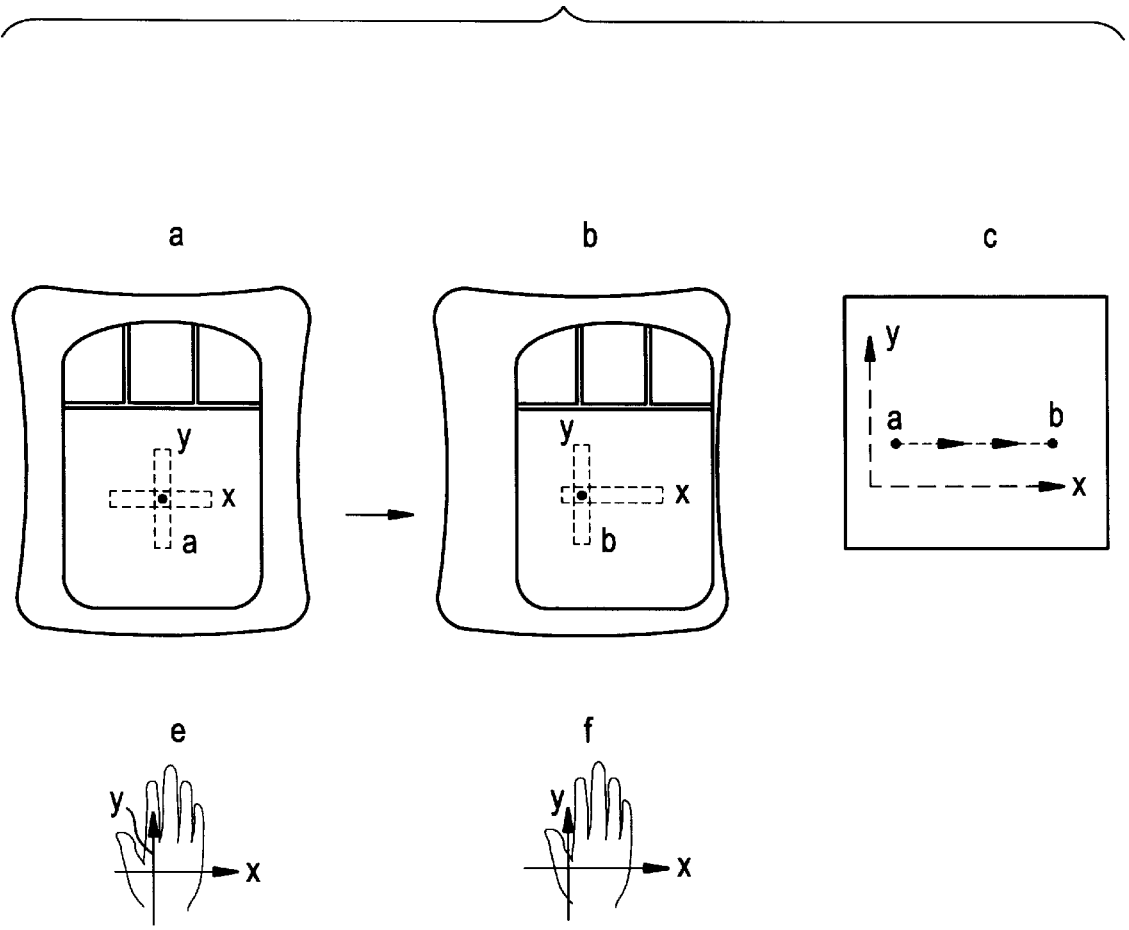
FIGS. 9A–C are the schematic view of the embodiment of the present invention.

As shown in FIGS. 9A(a) and (b), the base of the mouse in the present invention is fixed on an exactly normal position, i. e. the mouse of the present invention is normally positioned and is pressed by palm, then the cursor will be moved from a point a to a point b horizontally on a display according to the natural direction of human (horizontal rightwards), according to the direction of Ergonomics, now the mouse held by palm will the naturally moved rightwards. In said figure, the X and Y axes of the palm are the directions of the X and Y axes in the hollow portion of said movable optic grid, in consequence, in the computer display shown in FIG. 9A(c), the cursor is moved from the point a to the point b to show a horizontally rightward movement.

Figure 9B:
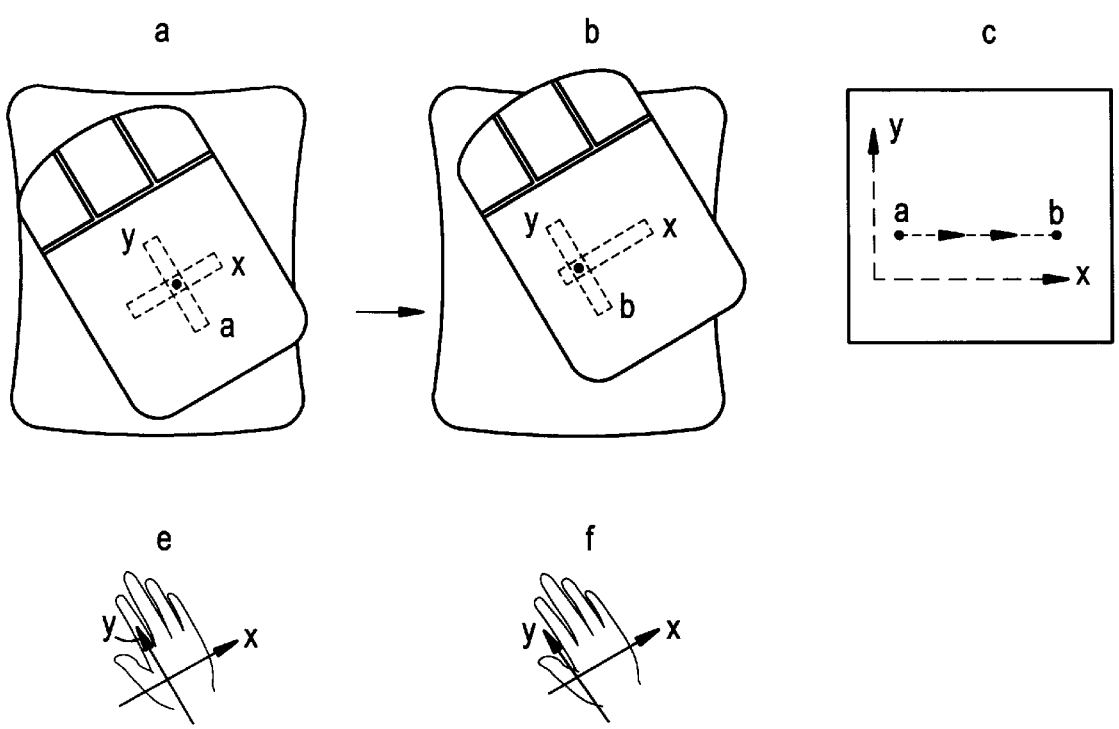

As shown in FIGS. 9B(a) and (b), the base of the mouse in the present invention is fixed on an exactly normal position, besides, the mouse of the present invention is also inclined leftwards, then the mouse of the present invention is pressed by palm, and the cursor will be moved from the point a to the point b horizontally on a display according to the natural direction of human (horizontally rightwards), according to the direction of Ergonomics, now the mouse held by palm will naturally move upwards and leftwards. In said figure, the X and Y axes of the palm are the directions of the X and Y axes in the hollow portion of said movable optic grid, in consequence, in the computer display shown in FIG. 9B(c), the cursor is moved from the point a to the point b to show a horizontally rightward movement.

Figure 9C:
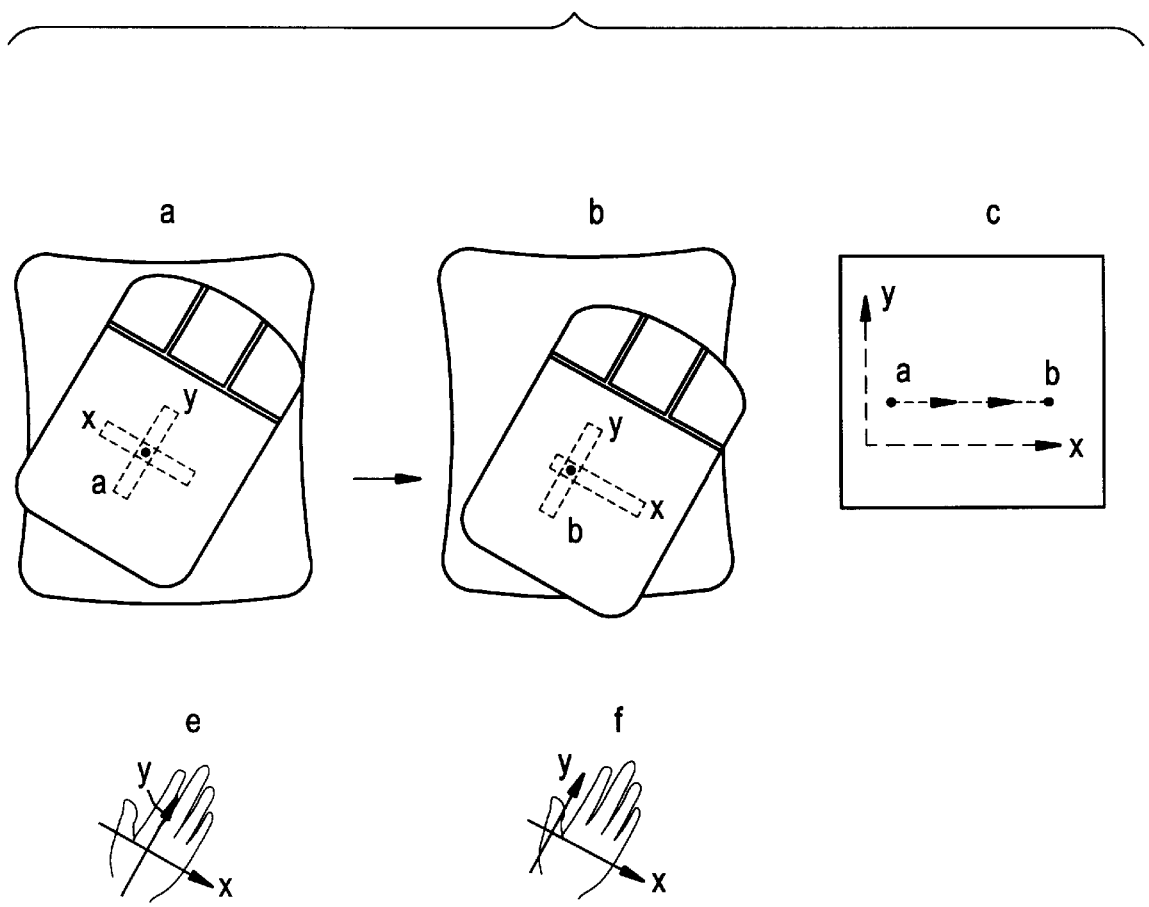

As shown in FIGS. 9C(a) and (b), the base of the mouse in the present invention is fixed on an exactly normal position, besides, the mouse of the present invention is also inclined rightwards, then the mouse of the present invention is pressed by palm, and the cursor will be moved form the point a to the point b horizontally on a display according to the natural direction of human (horizontally rightwards), according to the direction of Ergonomics, now the mouse held by palm will naturally move upwards and downwards. In said figure, the X and Y axes of the palm are the directions of the X and Y axes in the hollow portion of said movable optic grid, in consequence, in the computer display shown in FIG. 9C(c), the cursor is moved from the point a to the point b to show a horizontally rightwards movement.

Figure 10A:
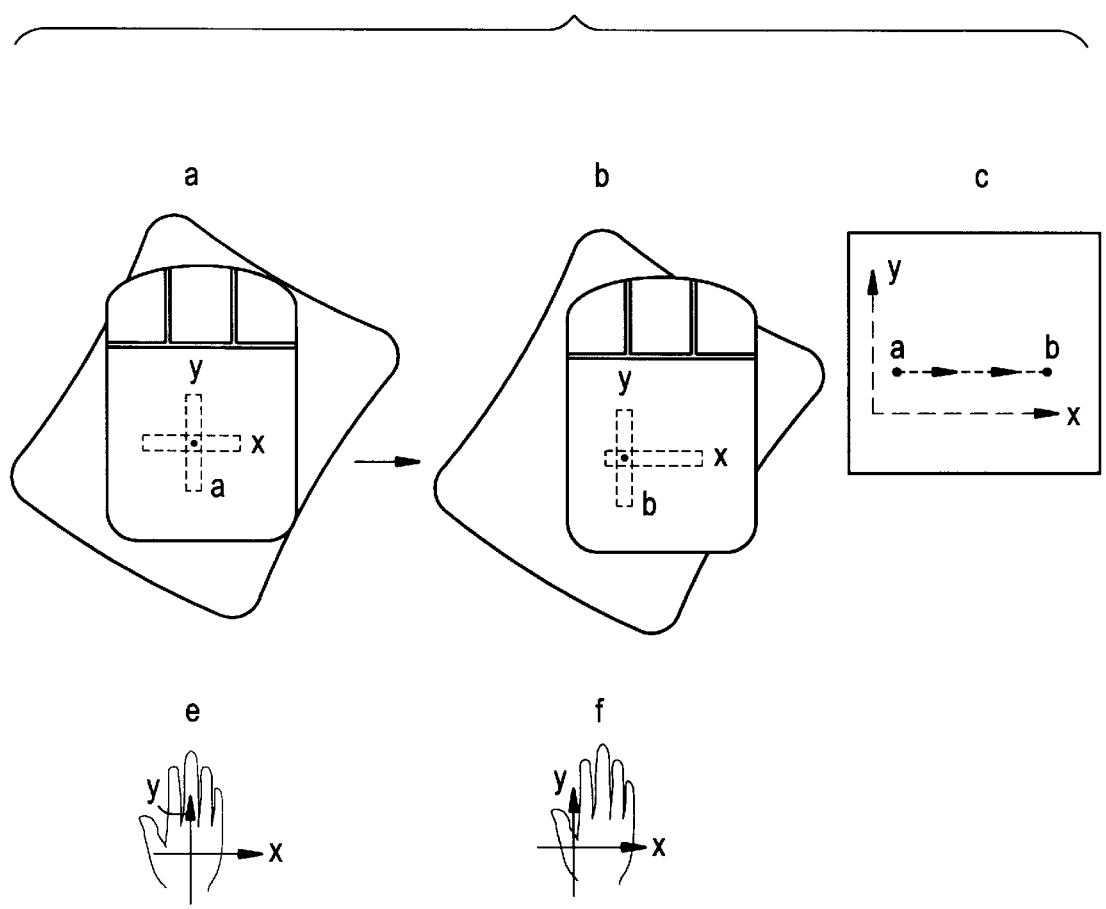
FIGS. 10A, B are the schematic view of the embodiment of the present invention.

As shown in FIGS. 10A(a) and (b), the base of the mouse in the present invention is positioned rightwards, the mouse of the present invention is pressed by palm, then the cursor will be moved form the point a to the point b horizontally on a display according to the natural direction of human (horizontal rightwards), according to the direction of Ergonomics, now the mouse held by palm will the naturally moved rightwards. In said figure, the X and Y axes of the palm are the directions of the X and Y axes in the hollow portion of said movable optic grid, in consequence, in the computer display shown in FIG. 10B(c), the cursor is moved from the point a to the point b to show a horizontally rightward movement.

Figure 10B:
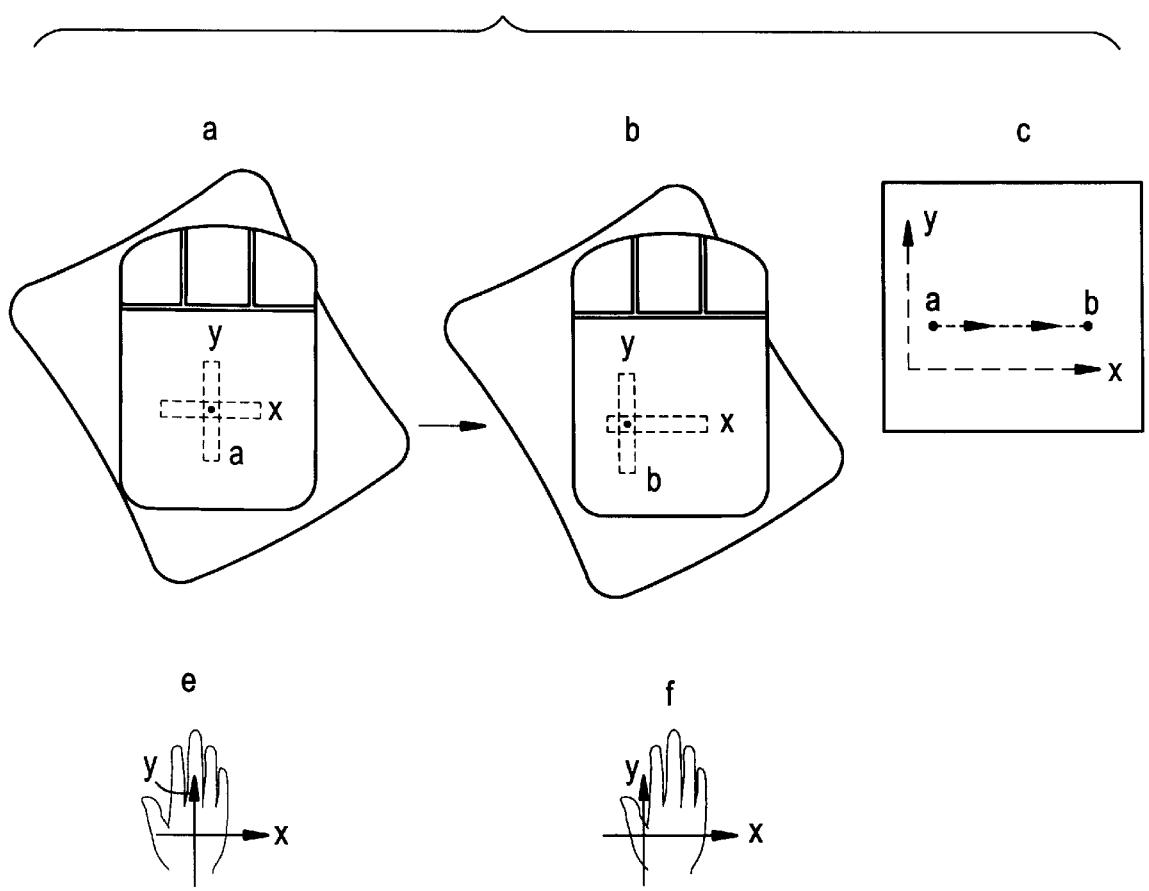

As shown in FIGS. 10B(a) and (b), the base of the mouse in the present invention is positioned leftwards, the mouse of the present invention is pressed by palm, then the cursor will be moved form the point a to the point b horizontally on a display according to the natural direction of human (horizontal rightwards), according to the direction of Ergonomics, now the mouse held by palm will the naturally moved rightwards. In said figure, the X and Y axes of the palm are the directions of the X and Y axes in the hollow portion of said movable optic grid, in consequence, in the computer display shown in FIG. 10C(c), the cursor is moved from the point a to the point b to show a horizontally rightward movement.

From the aforementioned description, it is apparent that in the usage of the mouse of the present invention, the natural direction of human may match with the direction of palm in Ergonomics, thus the moving direction of the cursor on the display will coincide with the natural direction of human. That is, the mouse base of the present invention may be positioned as pleasure without affecting the operation of said mouse, or if the mouse of the present invention is positioned so to incline with an angle, the mouse is still operated normally, thus the function of said mouse will not be affected.

Figure 11A:
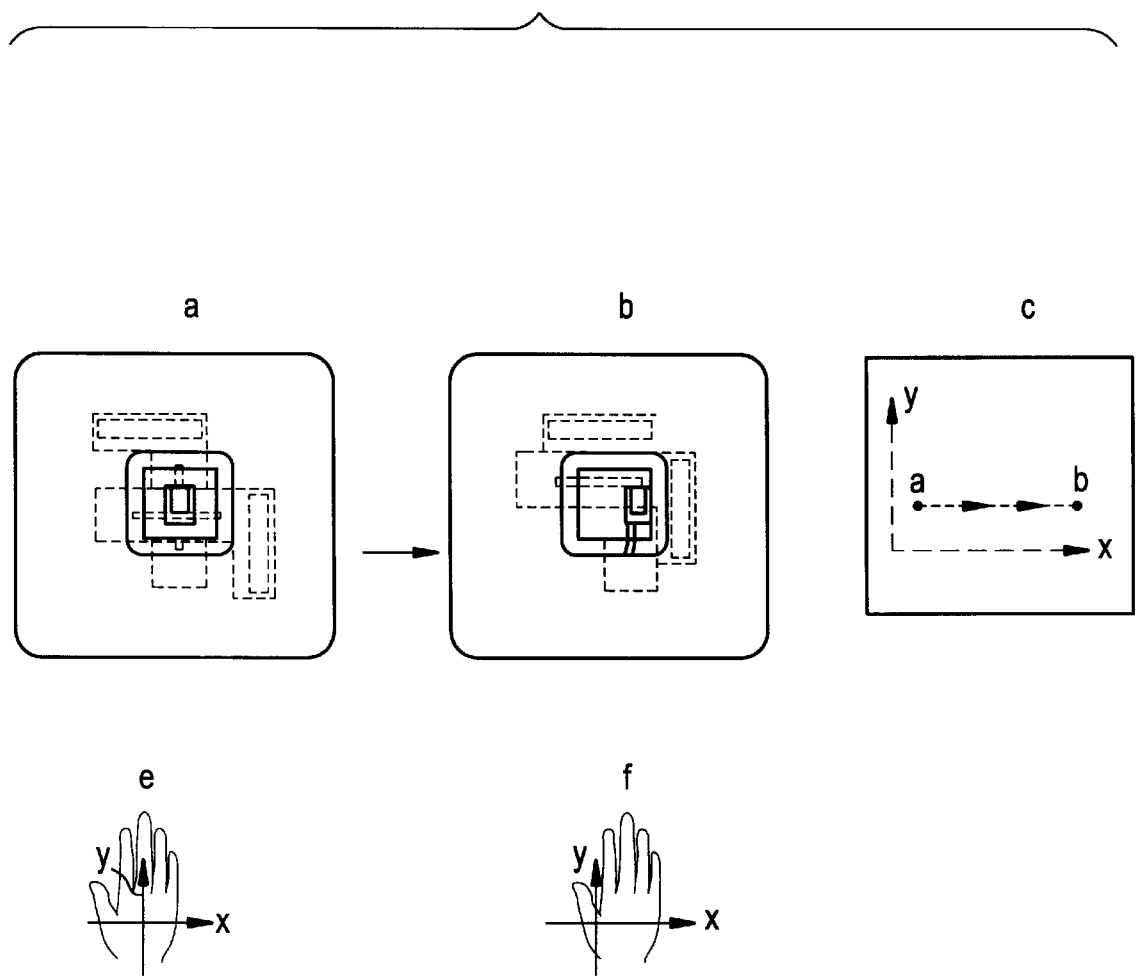
FIGS. 11A–C are the schematic view of the mouse in the prior art.

As shown in FIGS. 11A(a) and (b), the base of the mouse in the prior art is fixed on a exactly normal position, and the mouse of the prior art is inclined leftwards and is pressed by palm, then the cursor will be moved form the point a to the point b horizontally on a display according to the natural direction of human (horizontal rightwards), according to the direction of Ergonomics, now the mouse held by palm will the naturally moved rightwards and upwards. In said figure, the X and Y axes of the palm are the directions of the X and Y axes in the hollow portion of said movable optic grid, in consequence, in the computer display shown in FIG. 11A(c), the cursor is moved from the point a to the point b to show a horizontally rightward and upward movement.

Figure 11B:
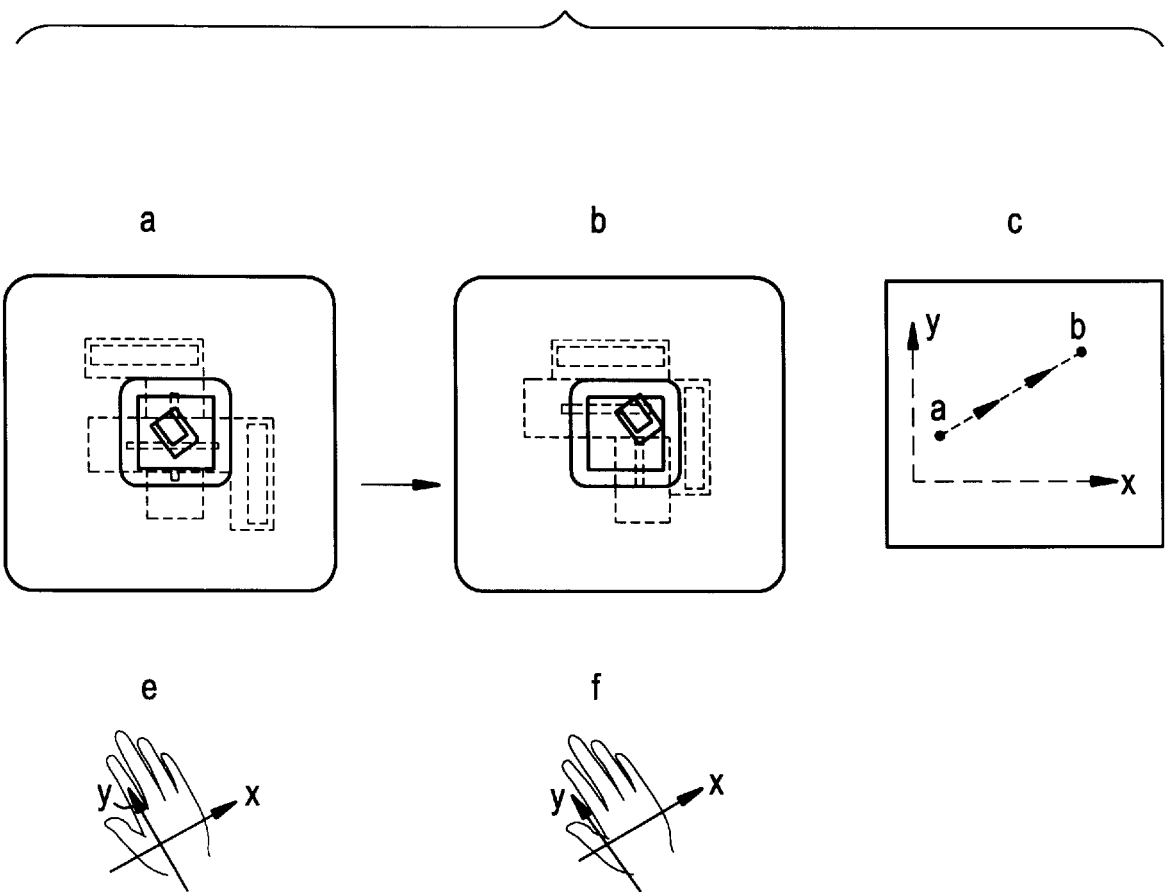
Figure 11C:
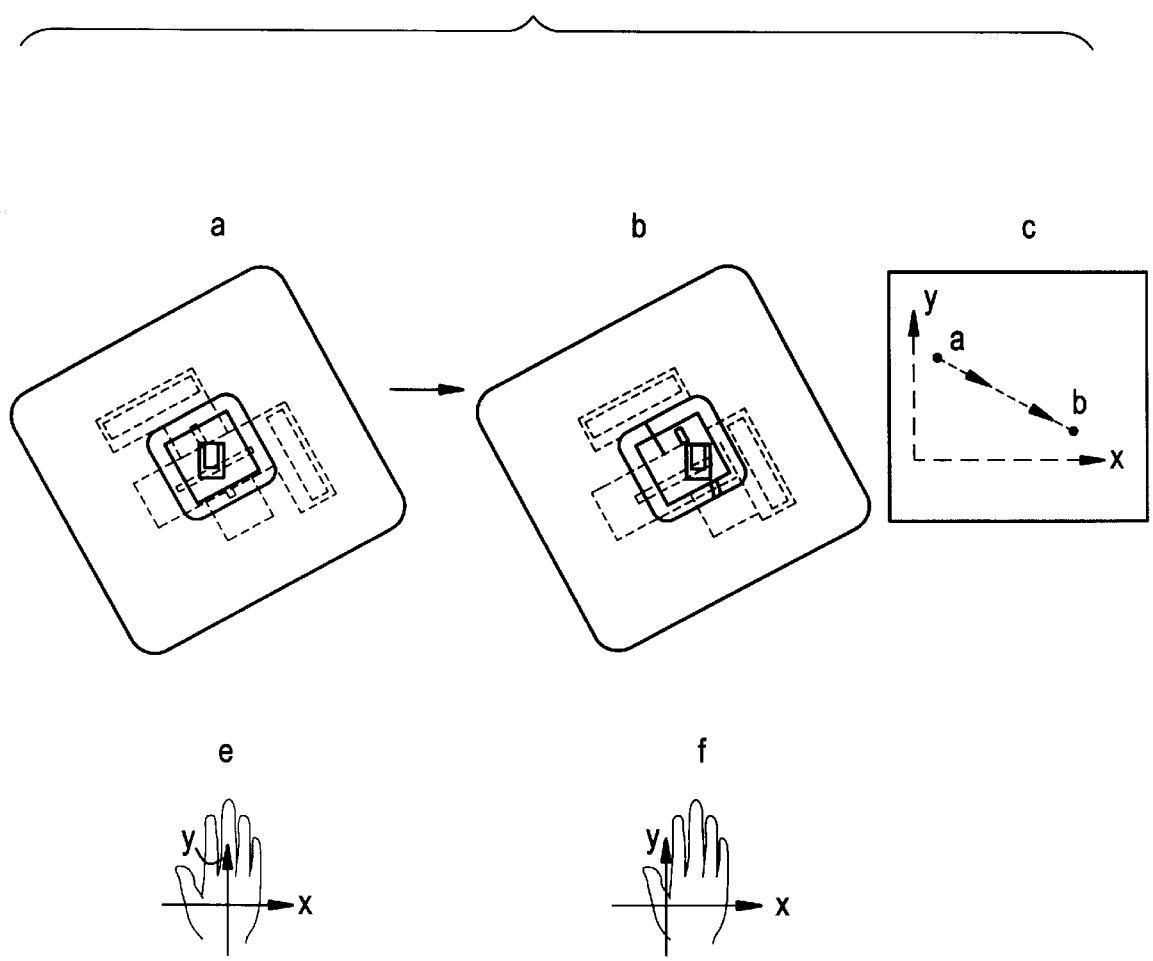

As shown in FIGS. 11B(a) and (b), the base of the mouse in the prior art is fixed to be inclined leftwards and is pressed by palm, then the cursor will be moved form the point a to the point b horizontally on a display according to the natural direction of human (horizontal rightwards), according to the direction of Ergonomics, now the mouse held by palm will the naturally moved rightwards and upwards. In said figure, the X and Y axes of the palm are the directions of the X and Y axes in the hollow portion of said movable optic grid, in consequence, in the computer display shown in FIG. 11C(c), the cursor is moved from the point a to the point b to show a horizontally rightward and downward movement. (that is: the user intends that the cursor will be moved horizontally rightly and he (or she) also operates accordingly, but the cursor on the display is moved rightwards and upwards).

From the description hereinbefore, it is appreciated that in the usage of the mouse of the prior art, the natural direction of human will not match with the direction of palm in Ergonomics, thus the moving direction of the cursor on the display will not coincide with the natural direction of human.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

TABLE I

|     | 1 | 2 | 3 | 4 |
|-----|---|---|---|---|
| XA  | 0 | 1 | 1 | 0 |
| XB  | 0 | 0 | 1 | 1 |
| X + direction | | | | |
| XA  | 1 | 1 | 0 | 0 |
| XB  | 0 | 1 | 1 | 0 |
| X − direction | | | | |
| XA  | 0 | 0 | 1 | 1 |
| XB  | 1 | 0 | 0 | 1 |
| Xmax | 1 | | | |
|     | 1 | | | |

TABLE I-continued

Xmin    0
    0
Flag: Xman Xmin X +
Register: Xreg, X + reg, X − reg, Xmax reg, Xmin reg

TABLE II

VX represents the operating speed of the finger controllable member, and also provides a predetermined value as a reference value for speed determination.
V(n) represents the different moving speed of the finger controllable member and the setting of speed level reference value.
C1 represents the maximum displacement of the finger controllable member at minimum speed level.
C2 represents the maximum displacement of the finger controllable member at second speed level.
C3 represents the combined displacement of the finger controllable member, C1 + C2 = C3.
K(n) represents various reference constants at different speed level and the mutual relationship of various speeds of the finger controllable member.
V(n)X(n) represents the displacement of the finger controllable member at different speed level.
V1X1 + reg is a register for registering the displacement of the finger controllable member in positive direction at lowest speed level.
V2X2 + reg is a register for registering the displacement of the finger controllable member in positive direction at the second speed level.
Y1X1 − reg is a register for registering the displacement of the finger controllable member in negative direction at lowest speed level.
V2X2 − reg is a register for registering the displacement of the finger controllable member in negative direction at the second speed level.

The formulas used in the control program flow chart are defined in TABLE III as follows:

TABLE III

Formula 1. C1 + C2 = C3
formula 2. Kn = (n-1)K2 − (n-2)K1 n >= 3, K2 > K1
formula 3. (K1cursor1) + ((K2cursor2) = the displacement of the display
formula 4. Kn*VnXn = K2*V2X2 + K1*V1X1
formula 5. VnXn = V2X2 + V1X1

What is claimed is:

1. A device for controlling a cursor to rotate rightwards and leftwards comprising:

an upper case, including an upper case cover and an upper case base board, wherein the upper case cover includes input keys for pressing respective contact switches, and wherein the upper case cover includes locking lugs that engage with the upper case base board;

a central body including a cover and a base, wherein the base has a circular disk bottom and an engaging means for engaging with the cover of the central body, wherein an X-axis sliding bar and a Y-axis sliding bar are installed between the cover and the base and serve respectively as an X-axis movable optic grid and a Y-axis movable optic grid; wherein a transparent zone and an opaque X-axis photo grid zone are included on the X-axis movable optic grid, and wherein a transparent zone and an opaque Y-axis photo grid zone are included on the Y-axis movable optic grid; wherein two light emitting diodes are provided with the cover of the central body; wherein the central body further includes an X-axis photo transistor and a Y-axis photo transistor on each of which a fixed optic grid is disposed; wherein a peripheral portion of the base includes a first pair of U-shaped slots which allow the X-axis movable optic grid to slide therethrough and a second pair of U-shaped slots which allow the Y-axis movable optic grid to slide therethrough; and wherein a plurality of hooks are provided on a side of the base opposite to the U-shaped slots;

a lower case including a lower case base board and a lower case cover, wherein the lower case cover includes a central round hole defined therein, and wherein a control circuit board is provided between the lower case cover and the lower case base board;

wherein the plurality of hooks provided on the base of i the central body extend through the central round hole of the lower case cover and slide into slots defined in the lower case base board such that the base of the central body connects with the lower case cover.

2. The device for controlling a cursor to rotate rightwards and leftwards as claimed in claim 1, wherein the lower case base board includes a plurality of pillars, and wherein the side of the base of the central body opposite to the U-shaped slots includes a plurality of slots, and wherein the pillars of the lower case base board extend into the slots of the circular base of the central body.

3. A device for controlling a cursor to rotate rightwards and leftwards comprising:

an upper case, including an upper case cover and an upper case base board, wherein the upper case cover includes input keys for pressing respective contact switches, and wherein the upper case cover includes locking lugs that engage with the upper case base board;

a central body including a cover and a base, wherein the base has a circular disk bottom and an engaging means for engaging with the cover of the central body, wherein an X-axis sliding bar and a Y-axis sliding bar are installed between the cover and the base and serve respectively as an X-axis movable optic grid and a Y-axis movable optic grid; wherein a transparent zone and an opaque X-axis photo grid zone are included on the X-axis movable optic grid, and wherein a transparent zone and an opaque Y-axis photo grid zone are included on the Y-axis movable optic grid; wherein two light emitting diodes are provided with the cover of the central body; wherein the central body further includes an X-axis photo transistor and a Y-axis photo transistor on each of which a fixed optic grid is disposed; wherein a peripheral portion of the base includes a first pair of U-shaped slots which allow the X-axis movable optic grid to slide therethrough and a second pair of U-shaped slots which allow the Y-axis movable optic grid to slide therethrough; and wherein a plurality of pillars and a plurality of hooks are provided on a side of the base of the central body opposite to the U-shaped slots;

a lower case including a lower case base board and a lower case cover, wherein a control circuit board is provided between the lower case cover and the lower case base board.

4. The device for controlling a cursor to rotate rightwards and leftwards as claimed in claim 3, wherein the pillars on the base of the central body extend into slots defined in the lower case base board.

5. A device for controlling a cursor to rotate rightwards and leftwards comprising:

an upper case, including an upper case cover and an upper case base board, wherein the upper case cover includes input key1s for pressing respective contact switches, and wherein the upper case cover includes locking lugs that engage with the upper case base board;

a central body including a cover and a base, wherein the base has a circular disk bottom and an engaging means for engaging with the cover of the central body, wherein an X-axis sliding bar and a Y-axis sliding bar are installed between the cover and the base and serve respectively as an X-axis movable optic grid and a Y-axis movable optic grid; wherein a transparent zone and an opaque X-axis photo grid zone are included on the X-axis movable optic grid, and wherein a transparent zone and an opaque Y-axis photo grid zone are included on the Y-axis movable optic grid; wherein two light emitting diodes are provided with the cover of the central body; wherein the central body further includes an X-axis photo transistor and a Y-axis photo transistor on each of which a fixed optic grid is disposed; wherein a peripheral portion of the base includes a first pair of U-shaped slots which allow the X-axis movable optic grid to slide therethrough and a second pair of U-shaped slots which allow the Y-axis movable optic grid to slide therethrough; and wherein a plurality of hooks are provided on a side of the base of the central body opposite to the U-shaped slots; and a lower case including a lower case base board and a lower case cover, wherein a control circuit board is provided between the lower case cover and the lower case base board, and wherein a plurality of slots are defined in the lower case base board, wherein the slots are used to control a rotary angle of the circular base of the central body.

6. A device for controlling a cursor to rotate rightwards and leftwards comprising:

an upper case including an upper case cover and an upper case base board, wherein the upper case cover includes a plurality of input keys and locking lugs, and wherein the upper case base board includes locking slots for engaging the upper case base board with the upper case cover;

a central body including a cover which is formed of a substantially square shape and a base which includes a circular shaped lower portion;

a lower case including a lower case cover, a lower case base board, and a control circuit board located between the lower case cover and the lower case base board, wherein a tap hole is defined in each corner of the lower case cover and the lower case base board for screwing the lower case cover and the lower case base board together, and wherein the lower case base board includes a concave base for accommodating the control circuit board, the control circuit board including:

an X-axis movable optic grid which has a transparent zone and an opaque photo grid zone located therein, and a hollow shaft concentrically disposed thereon, wherein the hollow shaft includes a rope wound around thereof for rotating the X-axis movable optic grid, the hollow shaft being engaged with a shaft and a bearing located on the control circuit board, and the rope being enclosed by a protecting tube;

a Y-axis movable optic grid which has a transparent zone and an opaque photo grid zone located therein, and a hollow shaft concentrically disposed thereon, wherein the hollow shaft includes a rope wound around thereof for rotating the Y-axis movable optic grid, the hollow shaft being engaged with a shaft and a bearing located on the control circuit board, and the rope being enclosed by a protecting tube;

an X-axis photo electric means including a light emitting diode and a photo transistor, the photo transistor having a fixed photo grid disposed thereon, and wherein the photo electric means further includes a central slot defined therein through which the X-axis movable optic grid moves;

a Y-axis photo electric means including a light emitting diode and a photo transistor, the photo transistor having a fixed photo grid disposed thereon, and wherein the photo electric means further includes a central slot defined therein through which the Y-axis movable optic grid moves;

a spindle having a screw hole defined in a center thereof for securing the spindle with the base of the central body with a screw, the spindle engaging with a bearing and a bearing seat of the lower case base board; and electronic circuit components of integrated circuits.

7. The device for controlling a cursor to rotate rightwards and leftwards as claimed in claim 6, wherein a slot structure is provided above the base of the central body, wherein the slot structure includes a plurality of U shaped slots symmetrically located on the central body base, wherein an X axis sliding bar is received in a first pair of the U shaped slots and a Y axis sliding bar is received in a second pair of the U shaped slots, wherein a sliding block is provided on each end of the X axis sliding bar and on each end of the Y axis sliding bar, wherein a middle portion of each of the sliding bars between the respective sliding blocks defines a strip space for a rope to slide, wherein the X axis sliding bar is connected with the X axis movable optic grid by the rope associated with the X-axis movable optic grid, and wherein the Y axis sliding bar is connected with the Y axis movable optic grid by the rope associated with the Y-axis movable optic grid.

8. The device for controlling a cursor to rotate rightwards and leftwards as claimed in claim 7, wherein the X axis sliding bar and the Y axis sliding bar are positioned into the slot structure vertically spaced apart such that the sliding bars do not collide or cause friction with one another.

9. The device for controlling a cursor to rotate rightwards and leftwards as claimed in claim 7, wherein a design for driving the X axis sliding bar and the Y axis sliding bar by the ropes reduces a moving area of the X-axis movable optic grid and the Y-axis movable optic grid.

10. The device for controlling a cursor to rotate rightwards and leftwards as claimed in claim 6, wherein in the lower case cover includes a central hole defined therein, and wherein a circumference of an upper half of the central hole is larger than a circumference of a lower half of the central hole.

11. The device for controlling a cursor to rotate rightwards and leftwards as claimed in claim 6, wherein a fixing point is provided on a middle portion of the rope for fixing on the hollow shaft of the X-axis movable optic grid, and wherein a fixing point is provided on a middle portion of the rope for fixing on the hollow shaft of the Y-axis movable optic grid.

12. The device for controlling a cursor to rotate rightwards and leftwards as claimed in claim 6, wherein a convex point is provided on a periphery of the X-axis movable optic grid, and a stopping pillar is provided on the control circuit board for controlling a rotary angle of the X-axis movable optic grid, and wherein a convex point is provided on a periphery of the Y-axis movable optic grid, and a stopping pillar is provided on the control circuit board for controlling a rotary angle of the Y-axis movable optic grid.

13. A device for controlling a cursor to rotate rightwards and leftwards comprising:

an upper case including an upper case cover and an upper case base board, wherein the upper case cover includes a plurality of input keys and locking lugs, and wherein the upper case base board includes locking slots for engaging the upper case base board with the upper case cover;

a central body having a cylinder shape;

a lower case including a lower case cover, a lower case base board, and a control circuit board located between the lower case cover and the lower case base board, wherein a tap hole is defined in each corner of the lower case cover and the lower case base board for screwing the lower case cover and the lower case base board together, and wherein the lower case base board includes a concave base for accommodating the control circuit board, the control circuit board including:

an X-axis movable optic grid which has a transparent zone and an opaque photo grid zone located therein, and a hollow shaft concentrically disposed thereon, wherein the hollow shaft includes a rope wound around thereof for rotating the X-axis movable optic grid, the hollow shaft being engaged with a shaft and a bearing located on the control circuit board, and the rope being enclosed by a protecting tube;

a Y-axis movable optic grid which has a transparent zone and an opaque photo grid zone located therein, and a hollow shaft concentrically disposed thereon, wherein the hollow shaft includes a rope wound around thereof for rotating the Y-axis movable optic grid, the hollow shaft being engaged with a shaft and a bearing located on the control circuit board, and the rope being enclosed by a protecting tube;

an X-axis photo electric means including a light emitting diode and a photo transistor, the photo transistor having a fixed photo grid disposed thereon, and wherein the photo electric means further includes a central slot defined therein through which the X-axis movable optic grid moves;

a Y-axis photo electric means including a light emitting diode and a photo transistor, the photo transistor having a fixed photo grid disposed thereon, and wherein the photo electric means further includes a central slot defined therein through which the Y-axis movable optic grid moves;

a spindle having a screw hole defined in a center thereof for securing the spindle with the base of the central body with a screw, the spindle engaging with a bearing and a bearing seat of the lower case base board; and electronic circuit components of integrated circuits.

* * * * *